United States Patent
Yang et al.

(10) Patent No.: US 9,720,267 B2
(45) Date of Patent: Aug. 1, 2017

(54) DISPLAY DEVICE

(71) Applicant: LG Chem, Ltd., Seoul (KR)

(72) Inventors: Se Woo Yang, Daejeon (KR); Kum Suek Seo, Daejeon (KR); Jong Sung Park, Daejeon (KR); Min Soo Park, Daejeon (KR); Ji Young Hwang, Daejeon (KR); Jae Ho Jung, Daejeon (KR); In Ju Mun, Daejeon (KR); Yong Su Park, Daejeon (KR)

(73) Assignee: LG Chem, Ltd. (KR)

( * ) Notice: Subject to any disclaimer, the term of this patent is extended or adjusted under 35 U.S.C. 154(b) by 118 days.

(21) Appl. No.: 14/431,495

(22) PCT Filed: Feb. 20, 2014

(86) PCT No.: PCT/KR2014/001381
§ 371 (c)(1),
(2) Date: Mar. 26, 2015

(87) PCT Pub. No.: WO2014/129820
PCT Pub. Date: Aug. 28, 2014

(65) Prior Publication Data
US 2015/0260907 A1 Sep. 17, 2015

(30) Foreign Application Priority Data

Feb. 20, 2013 (KR) .......... 10-2013-0018123
Jun. 19, 2013 (KR) .......... 10-2013-0070623
(Continued)

(51) Int. Cl.
*G02F 1/1333* (2006.01)
*F21V 8/00* (2006.01)
(Continued)

(52) U.S. Cl.
CPC .......... *G02F 1/1333* (2013.01); *B65D 65/14* (2013.01); *B65D 65/38* (2013.01); *B65D 85/38* (2013.01);
(Continued)

(58) Field of Classification Search
CPC ............. G02F 1/1333; G02F 1/133308; G02F 2001/133314; G02F 2001/133325;
(Continued)

(56) References Cited

U.S. PATENT DOCUMENTS 7,683,980 B2  3/2010  Ohta et al.
8,947,616 B2 *  2/2015  Tang .............. G02F 1/1333
                                              349/58
(Continued)

FOREIGN PATENT DOCUMENTS

CN    1603866 A    4/2005
CN  101033380 A    9/2007
(Continued)

OTHER PUBLICATIONS

IPO Search Report from Taiwan Application No. 103105774, dated Mar. 16, 2016.
(Continued)

*Primary Examiner* — Bao Q Truong
(74) *Attorney, Agent, or Firm* — Lerner, David, Littenberg, Krumholz & Mentlik, LLP

(57) ABSTRACT

Provided are a display panel, a backward diode equipped on a bottom surface of the display panel, a packaging film for packaging the backward diode, and a pressure-sensitive adhesive layer formed between the display panel and the packaging film. The packaging film includes a first region corresponding to a top surface of the backward diode, and a second region extending from the first region and corre-
(Continued)

sponding to a side surface of the backward diode. Due to the display device, a bezel region can be minimized.

22 Claims, 15 Drawing Sheets

(30) Foreign Application Priority Data

| Aug. 1, 2013 | (KR) | 10-2013-0091343 |
|---|---|---|
| Aug. 1, 2013 | (KR) | 10-2013-0091469 |
| Aug. 1, 2013 | (KR) | 10-2013-0091470 |
| Aug. 1, 2013 | (KR) | 10-2013-0091471 |

(51) Int. Cl.
  *B65D 65/14* (2006.01)
  *B65D 65/38* (2006.01)
  *B65D 85/38* (2006.01)

(52) U.S. Cl.
  CPC ......... *G02B 6/0051* (2013.01); *G02B 6/0088* (2013.01); *G02F 1/133308* (2013.01); *G02F 2001/133314* (2013.01); *G02F 2001/133325* (2013.01); *Y10T 428/2419* (2015.01)

(58) Field of Classification Search
  CPC .......... G02F 2001/133317; G02F 2001/13332; G02F 1/133608; B65D 65/14; B65D 65/38; B65D 85/38; G02B 6/0051; G02B 6/0088; G02B 6/0086; G02B 6/009; Y10T 428/2419; F21V 15/01
  See application file for complete search history.

(56) References Cited

U.S. PATENT DOCUMENTS

| 8,956,033 | B2* | 2/2015 | Poorter | G02F 1/133308 362/602 |
|---|---|---|---|---|
| 2003/0232192 | A1 | 12/2003 | Kishioka et al. | |
| 2005/0014879 | A1 | 1/2005 | Moroishi et al. | |
| 2006/0262253 | A1* | 11/2006 | Teramoto | G02B 6/0011 349/110 |
| 2007/0166537 | A1 | 7/2007 | Nagamoto et al. | |
| 2008/0218671 | A1 | 9/2008 | Nakamura | |
| 2009/0034268 | A1 | 2/2009 | DiZio et al. | |
| 2010/0039584 | A1 | 2/2010 | Sasaki et al. | |
| 2010/0209703 | A1 | 8/2010 | Takarada et al. | |
| 2010/0315575 | A1 | 12/2010 | Chang et al. | |
| 2012/0169963 | A1* | 7/2012 | Park | G02F 1/133308 349/62 |

FOREIGN PATENT DOCUMENTS

| CN | 101116017 A | 1/2008 |
|---|---|---|
| CN | 101542197 A | 9/2009 |
| CN | 101660721 A | 3/2010 |
| CN | 101805566 A | 8/2010 |
| CN | 101261328 B | 10/2011 |
| CN | 102662256 A | 9/2012 |
| EP | 2053305 A1 | 4/2009 |
| EP | 2262203 A1 | 12/2010 |
| JP | 53-093047 | 8/1978 |
| JP | H11344937 A | 12/1999 |
| JP | 3243833 B2 | 1/2002 |
| JP | 2006195157 A | 7/2006 |
| JP | 2006249221 A | 9/2006 |
| JP | 2007-212995 A | 8/2007 |
| JP | 2008261962 A | 10/2008 |
| JP | 2009-076405 A | 4/2009 |
| JP | 2010044220 A | 2/2010 |
| JP | 2010535359 A | 11/2010 |
| JP | 2012103687 A | 5/2012 |
| KR | 10-0824866 B1 | 4/2008 |
| KR | 10-0876236 B1 | 12/2008 |
| KR | 10-0876248 B1 | 12/2008 |
| KR | 10-2010-0075322 A | 7/2010 |
| KR | 10-2010-0132360 A | 12/2010 |
| KR | 20120055061 A | 5/2012 |
| KR | 10-2012-0076071 A | 7/2012 |
| KR | 10-1178577 B1 | 8/2012 |
| KR | 10-2012-0126993 A | 11/2012 |
| TW | 200303911 A | 9/2003 |
| TW | 201100908 A | 1/2011 |
| TW | 201239058 A | 10/2012 |
| TW | 201250340 A | 12/2012 |
| WO | 2006075793 A1 | 7/2006 |
| WO | 2008096827 A1 | 8/2008 |
| WO | 2012-132115 A1 | 10/2012 |

OTHER PUBLICATIONS

Office Action from Chinese Application No. 201480003542.2, dated Oct. 20, 2016.
International Search Report for Application No. PCT/KR2014/001383 dated May 13, 2014.
Taiwanese Office Action for Application No. 103105773 dated Jan. 12, 2015.
International Search Report for Application No. PCT/KR2014/001381 dated May 20, 2014.
Search Report from Office Action from Chinese Application No. 2014800033111, dated Sep. 14, 2016.

* cited by examiner

FIG. 4
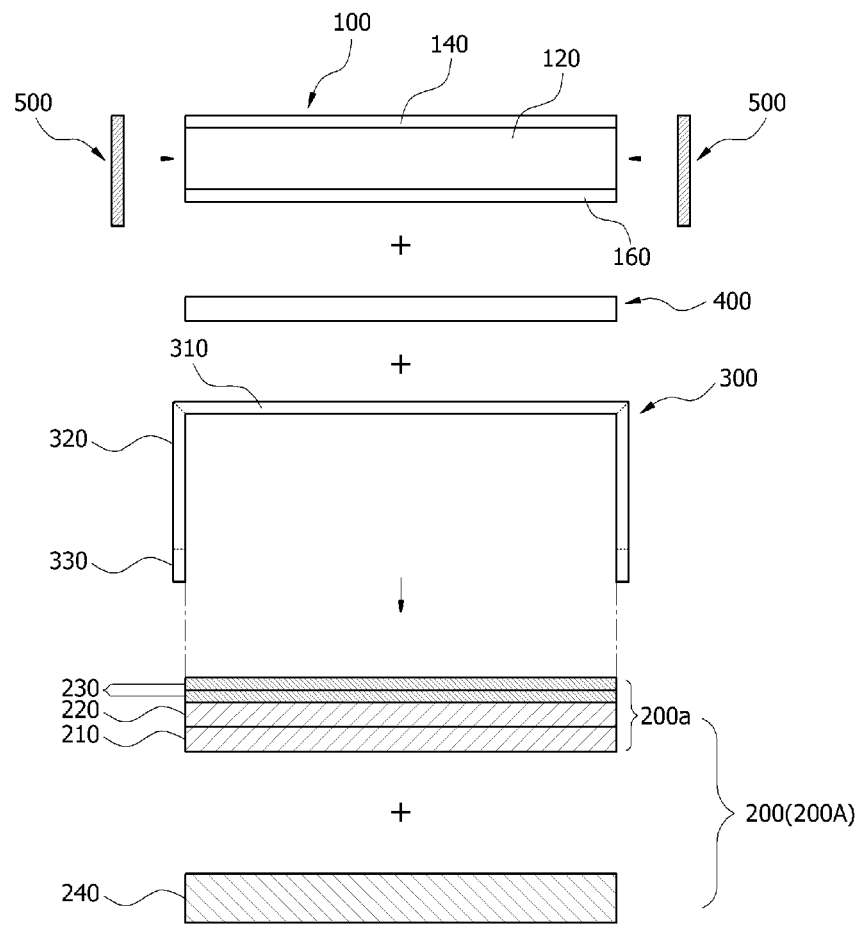
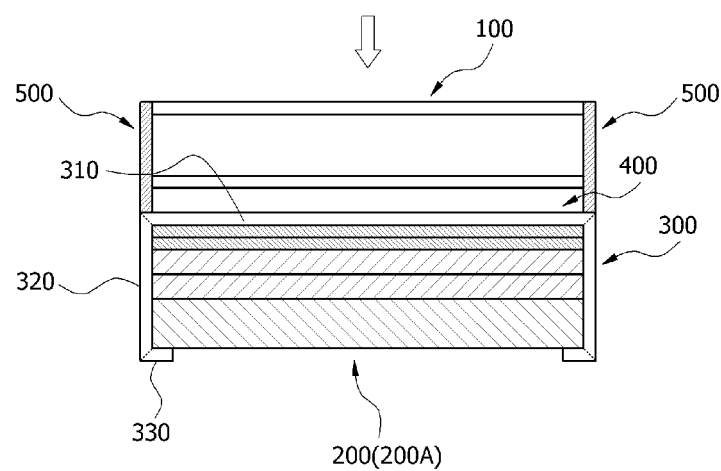

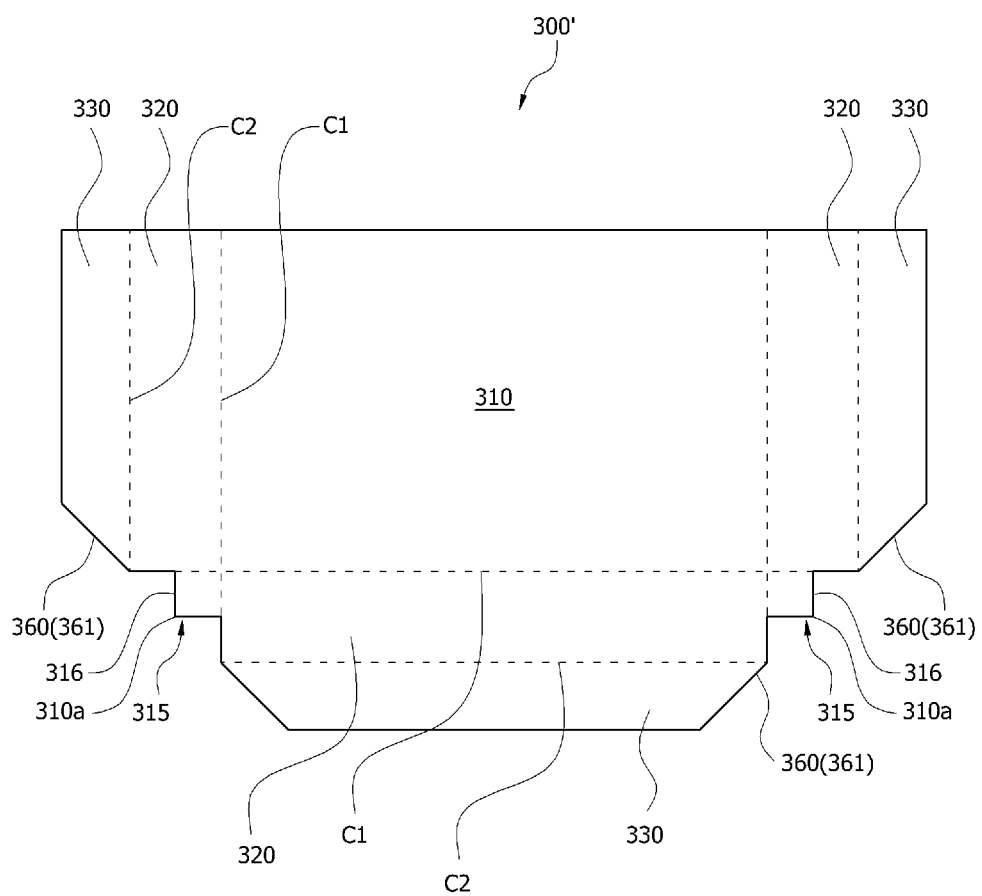

DISPLAY DEVICE

CROSS-REFERENCE TO RELATED APPLICATION

This application is a national phase entry under 35 U.S.C. §371 of International Application No. PCT/KR2014/001381, filed Feb. 20, 2014, which claims priority to Korean Patent Application No. 10-2013-0018123, filed Feb. 20, 2013, Korean Patent Application No. 10-2013-0070623, filed Jun. 19, 2013, Korean Patent Application No. 10-2013-0091343, filed Aug. 1, 2013, Korean Patent Application No. 10-2013-0091469, filed Aug. 1, 2013, Korean Patent Application No. 10-2013-0091470, filed Aug. 1, 2013 and Korean Patent Application No. 10-2013-0091471, filed Aug. 1, 2013, the disclosures of which are incorporated herein by reference.

BACKGROUND

1. Field of the Invention

The present application relates to a display device.

2. Discussion of Related Art

A display device is useful in various electronic products. For example, a device such as a liquid crystal display (LCD) is used in various products including a mobile phone, a personal digital assistant (PDA), an electronic game console, a monitor and a TV.

Generally, a display device has a display panel displaying an image. In addition, most of the display devices include a backward diode equipped on a bottom surface of the display panel. For example, an LCD device includes a back light unit (BLU) as a backward diode.

FIG. 1 is a cross-sectional diagram showing a display device, particularly, an LCD device, according to conventional art.

Referring to FIG. 1, the LCD device has an LCD panel 10 displaying an image. Generally, the LCD panel 10 is not self-emissive, and thus realizes an image by receiving light from an external environment. Accordingly, a backlight unit 20 is equipped as a backward diode on a bottom surface of the LCD panel 10.

The backlight unit 20 includes, for example, a light source 22 such as a light emitting diode (LED), a light guide plate 24 inducing light emitted from the light source 22 to the LCD panel 10 and converting a point light source generated from the light source 22 to a surface light source, and a diffuser sheet 26 diffusing light emitted from the light guide plate 24.

In addition, the LCD panel 10 has a liquid crystal cell layer 12 composed of liquid crystals changed in light transmittance due to application of an electric signal. The LCD panel 10 transmits or blocks light by changing or maintaining a polarizing direction of linearly polarized light transmitted by the liquid crystals according to the arrangement of liquid crystals. To this end, the LCD panel 10 has an upper polarizing plate 14 formed on the liquid crystal cell layer 12 and a lower polarizing plate 16 formed under the liquid crystal cell layer 12.

In addition, the conventional display device including the LCD device includes a molding frame 30 for assembling component members. As shown in FIG. 1, a backlight unit 20 is stacked on a bottom surface of the LCD panel 10, and then assembled and fixed by the molding frame 30 formed of a resin.

For example, related techniques are disclosed in Korean Patent Nos. 10-0824866, 10-0876236, 10-0876248 and 10-1178577.

However, the display device according to the conventional art has a bezel B as shown in FIG. 1 due to the use of the molding frame 30 as described above, and an area of the bezel B is also large. Due to such a bezel B, a display on which an actual image is shown becomes smaller than a surface area of the LCD panel 10.

In addition, the display device according to the conventional art may have problems in handling and assembly of the backward diode, that is, the backlight unit 20. For example, an assembling process using the molding frame 30 by inserting and fixing an optical member such as the light guide plate 24 or the diffuser sheet 26 to the molding frame 30 and stacking these components on a bottom surface of the LCD panel 10 may take too much time, and the optical members 24 and 26 may be damaged. Moreover, according to the assembly through the molding frame 30, a light leakage phenomenon may occur due to decreased sealability. Such a problem may bring an increase in costs and a decrease in yield of the display device, and have a bad influence on performance.

REFERENCES OF PRIOR ART (Reference 1) Korean Patent No. 10-0824866
(Reference 2) Korean Patent No. 10-0876236
(Reference 3) Korean Patent No. 10-0876248
(Reference 4) Korean Patent No. 10-1178577

SUMMARY OF THE INVENTION

The present application is directed to providing an improved display device. The present application provides, for example, a display device having a minimized bezel region.

One aspect of the present application provides a display device, which includes a display panel, a backward diode equipped on a bottom surface of the display panel, a packaging film packaging the backward diode, and a pressure-sensitive adhesive layer formed between the display panel and the packaging film. The packaging film includes a first region corresponding to a top surface of the backward diode, and a second region extending from the first region and corresponding to a side surface of the backward diode.

Another aspect of the present application provides a display device, which includes a display panel, a backward diode equipped on a bottom surface of the display panel, and a packaging film packaging the display panel and the backward diode. The packaging film includes a first region corresponding to a top surface of the display panel, and a second region extending from the first region and corresponding to a side surface of the display panel and a side surface of the backward diode.

According to a first embodiment of the present application, the packaging film may have an in-plane retardation ($R_{in}$) of 30 nm or less.

According to a second embodiment of the present application, the packaging film may have a thickness-direction retardation ($R_{th}$) of 35 nm or less.

According to a third embodiment of the present application, a notch part may be formed on a boundary line between the first region and the second region.

According to a fourth embodiment of the present application, a thickness of the packaging film may satisfy an area of the first region and the following Equation.

$$T \; [\mu m] = 100 \times S \; [m^2] + a \quad \text{[Equation]}$$

In Equation, T is a thickness of the packaging film (unit: μm), S is an area of the first region (width×length, unit: m²), and a is a number from 15 to 130.

According to a fifth embodiment of the present application, the packaging film may have at least one selected from the group consisting of physical properties (a) to (c).
(a) a tensile modulus of 1,200 MPa or more
(b) a tensile strength of 40 MPa or more
(c) an elongation of 20% or more According to a sixth embodiment of the present application, the packaging film may have a strain (E) according to the following Equation of 5% or less.

$$E \; (\%) = [(L2-L1)/L1] \times 100 \quad \text{[Equation]}$$

In the Equation, L1 is an initial length (width or length) of the packaging film, and L2 is an extended length of the packaging film after being maintained for 24 hours by applying a load of 3 kg at 80° C.

According to a seventh embodiment of the present application, the packaging film may further include a third region extending from the second region and corresponding to a bottom surface of the backward diode. An overlap preventing part may be formed in the third region.

According to an eighth embodiment of the present application, in the packaging film, at least the second region of the second and third regions may have light impermeability.

According to a ninth embodiment of the present application, in the packaging film, a light-impermeable part may be formed at an edge of the first region.

According to a tenth embodiment of the present application, the packaging film may include a projecting part in the first region.

According to an eleventh embodiment of the present application, in the packaging film, an adhesion-facilitating part may be formed on a top surface of the first region.

According to a twelfth embodiment of the present application, in the packaging film, a bottom surface of the first region may have a ribbed surface.

In addition, the backward diode may include an optical diode. The optical diode may include a light source, a light guide plate converting a point light source emitted from the light source into a surface light source, and a diffuser sheet diffusing light emitted from the light guide plate.

In addition, the display device according to the first embodiment of the present application may further include a barrier layer formed on a side surface of the display panel. The barrier layer may have at least moisture blockage. The barrier layer may include, for example, at least one selected from a moisture blocking resin layer, a metal thin film, and a deposition layer.

BRIEF DESCRIPTION OF THE DRAWINGS

The above and other objects, features and advantages of the present application will become more apparent to those of ordinary skill in the art by describing in detail exemplary embodiments thereof with reference to the adhered drawings, in which:

FIG. 4 is a cross-sectional view of a display device according to an embodiment of the present application;

FIG. 17 is a plan view of a packaging film according to an embodiment of the present application.

DETAILED DESCRIPTION OF EXEMPLARY EMBODIMENTS

Figure 1:
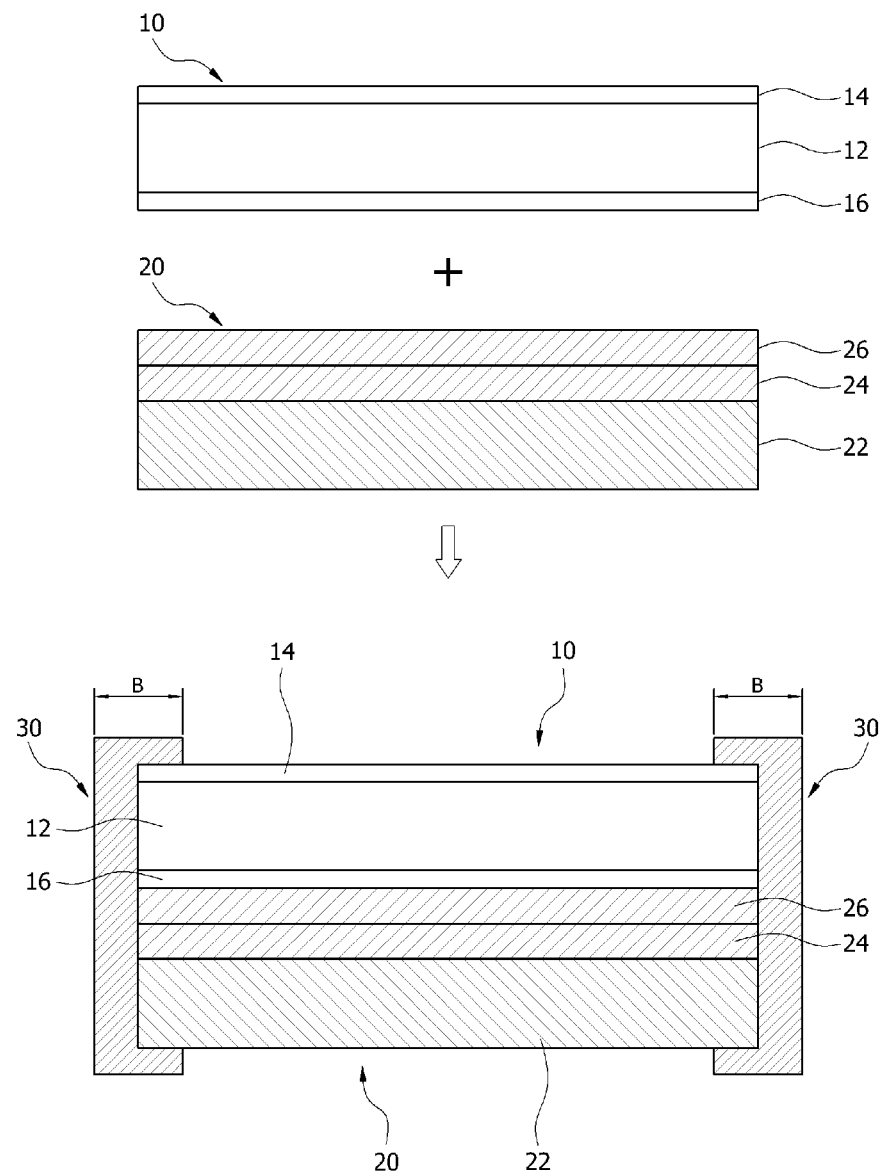
FIG. 1 is a cross-sectional view of a display device according to a conventional art.

In the specification, the term "and/or" includes at least one of the listed components.

In the specification, the terms "first," "second" and "third" are used to discriminate one component from other components, and these elements are not limited by these terms.

In the specification, the terms representing a direction such as "top surface," "side surface," and "bottom surface" are, unless specifically defined otherwise, based on directions of a display device seen by an observer (viewer).

In the specification, the term "corresponding" means that surfaces facing each other partially or entirely correspond to each other.

In the specification, the terms "formed on," "formed above," "formed under," and "formed on a side surface" do not only mean that corresponding components are stacked in direct contact with a different surface, but also include cases in which a different component is formed between the corresponding components. For example, the term "formed on" may indicate that a second component is formed in direct contact with a first component, or that a third component is also formed between the first component and the second component.

In the specification, the term "extension" may not imply that any one component (first component) is extended and formed in one process with another component (second component), but may indicate that two components (first and second components) are detachable members, and thus are extended by connection even when they are not formed in one process.

In the specification, the term "light transmittance" may indicate that radiated visible rays have a transmittance of 60% or more, for example, 80% or more, for example, 90% or more on a straight line. In the specification, the term "light impermeability" may indicate that radiated visible rays have a transmittance of, for example, 40% or less, for example, 30% or less, for example, 20% or less, for example, 10% or less on a straight line.

Hereinafter, display devices according to first and second embodiments of the present application will be described with reference to the accompanying drawings. The accompanying drawings show exemplary embodiments of the present application, and are provided to help understanding of the present application. In the accompanying drawings, to clearly express various layers and areas, thicknesses are exaggerated, and the scope of the present application is not limited by the thicknesses, sizes and ratios shown in the drawings. In description of the present application, detailed descriptions of related known general functions or components will be omitted.

First Embodiment

Embodiments of a display device according to a first embodiment of the present application are shown in FIGS. 2 to 9.

The display device according to the first embodiment of the present application includes a display panel 100, a backward diode 200 equipped on a bottom surface of the display panel 100, a packaging film 300 packaging the backward diode 200, and a pressure-sensitive adhesive layer 400 formed between the display panel 100 and the packaging film 300.

The packaging film 300 packages the backward diode 200 equipped on the bottom surface of the display panel 100. The packaging film 300 surrounds and packages at least a top surface 201 and a side surface 202 of the backward diode 200. To this end, the packaging film 300 includes a first region 310 corresponding to the top surface 201 of the backward diode 200 and a second region 320 corresponding to the side surface 202 of the backward diode 200. The second region 320 extends from the first region 310. The pressure-sensitive adhesive layer 400 adheres and fixes the display panel 100 to the packaging film 300.

According to the present application, an improved display device is embodied. For example, a bezel region is minimized by adhering and fixing the display panel 100 and the backward diode 200 using the packaging film 300 and the pressure-sensitive adhesive layer 400. According to the present application, the use of a molding frame 30 (refer to FIG. 1) may be excluded, thereby embodying a display device having almost no bezel. In addition, problems occurring in handling and assembly of the backward diode 200, for example, an optical diode on a film (or a sheet), are improved.

In the present application, the display panel 100 may be any one that can display an image without specific limitation.

The display panel 100 may include, for example, a component displaying an image by changing light transmittance, or a component displaying an image by emitting light from a fluorescent substance. Particularly, the display panel 100 may be selected from an LCD panel displaying an image using liquid crystals changed in light transmittance, a plasma display panel (PDP) displaying an image by generating gas discharging between two electrodes and emitting light from a fluorescent substance due to UV rays generated by the gas discharging, and/or an organic electroluminescent display panel displaying an image by emitting light from an organic light emitting diode (OLED) due to electric excitation occurring in an electrode.

Figure 2:
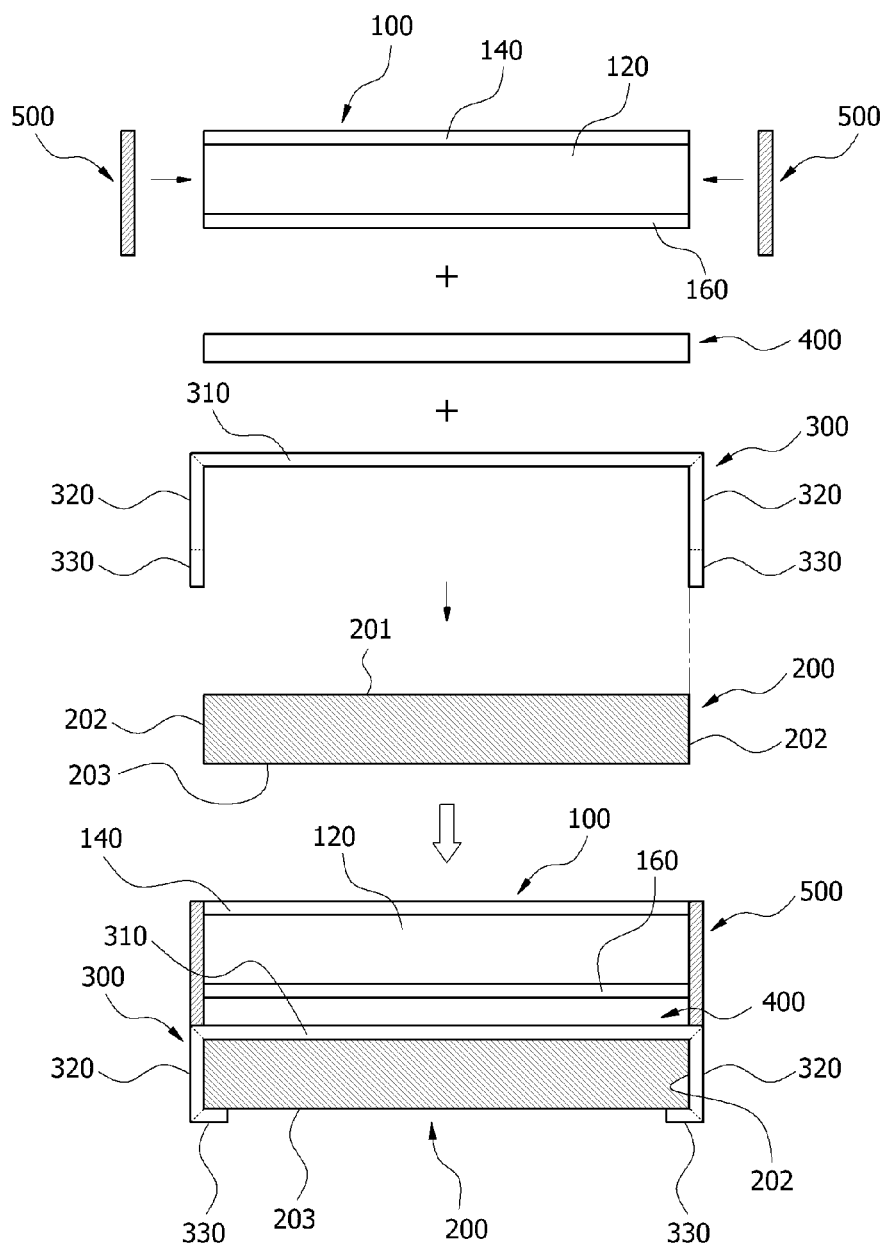
FIG. 2 is a cross-sectional view of a display device according to an embodiment of the present application.
Figure 3:
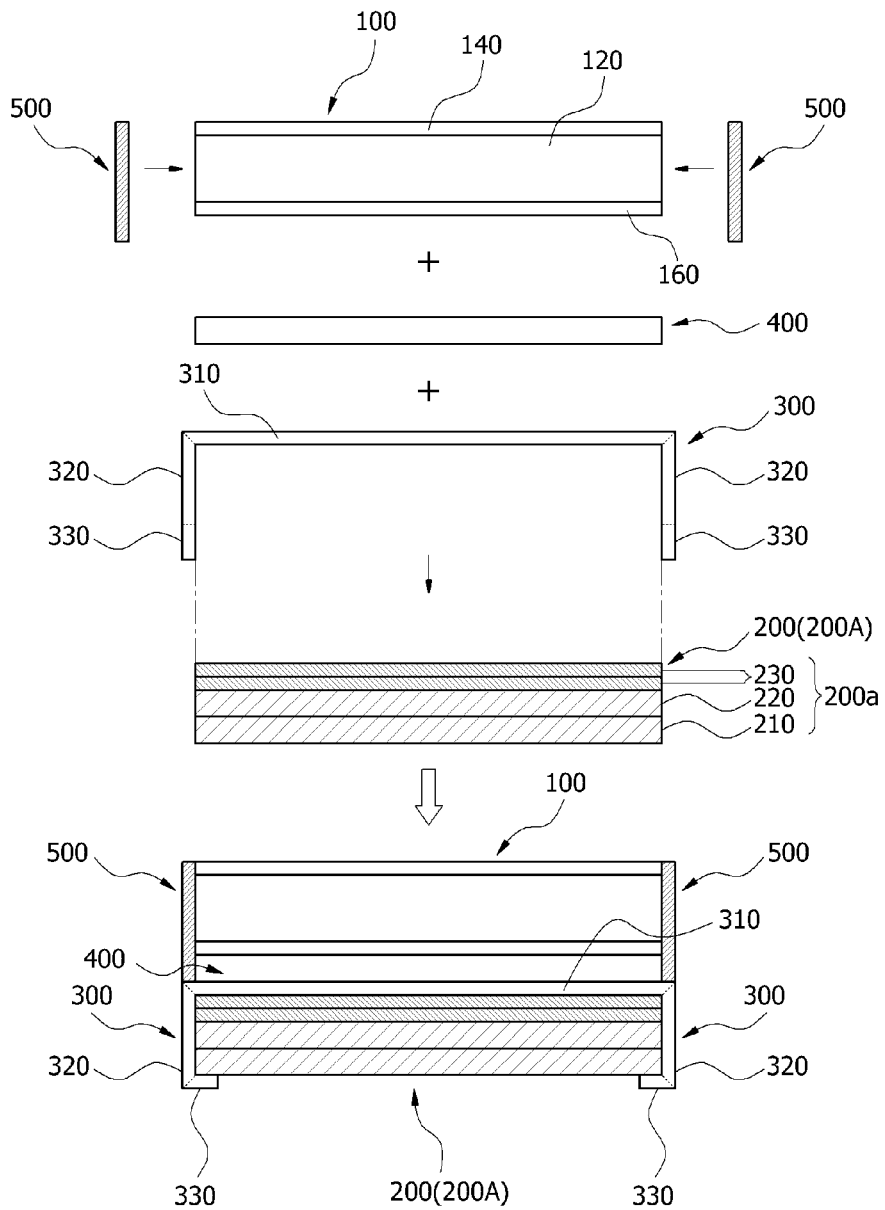
FIG. 3 is a cross-sectional view of a display device according to an embodiment of the present application.

FIGS. 2 to 4 show display panels 100 according to exemplary embodiments of the present application. FIGS. 2 to 4 specifically show LCD panels.

Referring to FIGS. 2 to 4, the display panel 100 includes, for example, at least one liquid crystal cell layer 120, and polarizing plates 140 and 160 formed on both surfaces of the liquid crystal cell layer 120. The polarizing plates 140 and 160 may include an upper polarizing plate 140 formed on the liquid crystal cell layer 120 and a lower polarizing plate 160 formed under the liquid crystal cell layer 120.

The liquid crystal cell layer 120 may include, for example, a thin film transistor (TFT) substrate, a color filter substrate facing the TFT substrate, and a liquid crystal cell interposed between the two substrates and in which light transmittance is changed by applying an electric signal.

The upper polarizing plate 140 and the lower polarizing plate 160 may have a polarizing characteristic, and their optical axes may be orthogonal to each other. For example, the optical axis of the upper polarizing plate 140 may be placed in a horizontal direction of the display panel 100, and the optical axis of the lower polarizing plate 160 may be placed in a vertical direction of the display panel 100. In one example, the upper polarizing plate 140 and the lower polarizing plate 160 may each include a polarizer and a protective film formed on one or both surfaces of the polarizer. The polarizer may be selected from, for example, polarizable polyvinylalcohol (PVA) films. In addition, the protective film may be a film including at least one selected from, for example, triacetyl cellulose (TAC) and an acrylic resin. Other than these, a pixel electrode for driving a pixel may be formed in the display panel 100, which is omitted from the drawing.

In addition, the display panel 100 may further include a different functional film or layer, in addition to the liquid crystal cell layer 120, the upper polarizing plate 140 and the lower polarizing plate 160. The display panel 100 may further include a light diffusion layer, a viewing angle compensation film, a retardation film, an anti-reflection layer, an anti-glare layer and/or a protective film layer for protecting these components. Moreover, such films and layers may be formed on the upper polarizing plate 140 or the lower polarizing plate 160. For example, at least one selected from a light diffusion layer, an anti-reflection layer, an anti-glare layer and a protective film for protecting these components may be further formed on the upper polarizing plate 140. These components, as separate members, may be stacked on the upper polarizing plate 140, or may be directly formed on a top surface of the upper polarizing plate 140. As an example, the anti-glare layer may be directly formed on a top surface of the upper polarizing plate 140 through surface treatment such as haze treatment.

In the present application, the backward diode 200 may be equipped on a bottom surface of the display panel 100 without particular limitation. The backward diode 200 may be formed of one member, or have a multi-layer structure including at least two members. Shapes and functions of the members constituting the backward diode 200 are not limited. The backward diode 200 may have, for example, a form of a film, sheet, planar plate and/or a three-dimensional device. Specifically, for example, the backward diode 200 may include at least one selected from an electric/electronic diode having an electric/electronic function, an optical diode having an optical function, and/or a heat dissipation diode having a heat dissipation function. Such a backward diode 200 is surrounded by a packaging film 300 as will be described below.

FIG. 2 shows a backward diode 200 composed of one member. Here, the backward diode 200 shown in FIG. 2 may be selected from, for example, an optical diode 200A, an electronic circuit board and a heat dissipation plate. Specifically, for example, the backward diode 200 may be selected from the optical diode 200A.

In the present application, the optical diode 200A has an optical function without limitation. The optical diode 200A may be, for example, a diode having functions such as diffusion, concentration, polarization and/or reflection of light, but the present application is not limited thereto. In addition, the optical diode 200A may include a light source generating light. In the specification, the optical diode 200A includes a light source generating light and/or all kinds of devices, films and/or sheets used to treat light.

The optical diode 200A may include, for example, at least one optical member 200a selected from a light guide plate, a diffuser sheet, a brightness enhancing film, a prism film, a lens film, a polarizing film, a reflective film, a viewing angle compensation film, a retardation film and a protective film for protecting these components. In addition, the optical diode 200A may be selected from a light source assembly further including a light source 240 in the optical member 200a. Here, a particular shape of the light source assembly is not specifically limited, and may be selected from conventional direct type and edge type light source assemblies. For example, as the optical diode 200A, the light source assembly may include a backlight unit (BLU) conventionally used in an LCD device.

In FIGS. 3 and 4, as the backward diode 200, the optical diode 200A having a multi-layer structure is shown. Specifically, as the backward diode 200, the optical diode 200A including a plurality of optical members 200a is shown in FIG. 3, and an optical diode 200A including a plurality of optical members 200a and a light source 240 is shown in FIG. 4.

Referring to FIG. 3, the optical diode 200A may include, as an optical member 200a, a light guide plate 210 converting a point light source emitted from a light source into a surface light source; and a diffuser sheet 220 formed on the light guide plate 210 and diffusing light generated from the light guide plate 210. In addition, the optical diode 200A may further include a brightness enhancing film 230 formed on the diffuser sheet 220. In addition, such an optical member 200a may be formed alone or in a combination of at least two thereof. In FIG. 3, the brightness enhancing film 230 is formed in a bilayer structure. Such an optical diode 200A is, as shown in FIG. 3, packaged by a packaging film 300, and equipped on a back surface of the display panel 100. Here, in FIG. 3, the light source providing light to the light guide plate 210 is not shown, but the light source may be, for example, separately equipped at an outside, and provide light to the light guide plate 210.

In addition, referring to FIG. 4, as the backward diode 200, the optical diode 220A may include an optical member 200a and a light source 240. In addition, these may be assembled, and then packaged by a packaging film 300. Particularly, the optical diode 200A is a light source assembly including the light source 240, and includes at least one light source 240 and an optical member 200a formed on the optical source 240. A plurality of the optical members 200a may be included, and each of the optical members 200a may include a light guide plate 210 converting a point light source emitted from the light source 240 into a surface light source; and a diffuser sheet 220 formed on the light guide plate 210 and diffusing light generated from the light guide plate 210. In addition, as shown in FIG. 4, the optical diode 200A may further include a brightness enhancing film 230 formed on the diffuser sheet 220.

In the present application, the light source 240 may emit light without particular limitation. The light source 240 may include, for example, a light emitting diode (LED). The light source 240 may include a plurality of LEDs and a case in which the LEDs are built according to an exemplary embodiment.

The packaging film 300 packages the above-described backward diode 200, for example, the optical diode 200A. Here, the light source 240 may not be packaged by the packaging film 300 as shown in FIG. 3, or may be packaged with the optical member 200a as shown in FIG. 4.

The packaging film 300 includes a first region 310, and a second region 320 extending from the first region 310. Here, the first region 310 corresponds to a top surface of the backward diode 200, and the second region 320 corresponds to a side surface 202 of the backward diode 200. The packaging film 300 may further include a third region 330 to obtain high fixation strength of the backward diode 200. The third region 330 extends from the second region 320, and corresponds to a bottom surface 203 of the backward diode 200. In FIGS. 5 to 9, exemplary embodiments of the packaging film 300 are shown.

Among the regions 310, 320 and 330 of the packaging film 300, at least the first region 310 and the second region 320 may have areas which are equal or similar to a part corresponding to the backward diode 200. For example, the area of the first region 210 may be equal or similar the area of the top surface 210 (refer to FIG. 2) of the backward diode 200, and the area of the second region 220 may be equal or similar to the side surface 202 (refer to FIG. 2) of the backward diode 200.

In addition, at least two second regions 320 may be included. For example, two to four second regions 320 are included. That is, the second region 320 may extend from the first region 310, and be formed on at least two of the four surfaces of the first region 310. In addition, for example, two to four third regions 330 are included, which may be the same as the number of the second regions 320. For example, in FIG. 5, three of the second regions 320 are formed, and the same number of the third regions 330 are formed.

In the present application, the packaging film 300 may be any one further including the first region 310 and the second region 320 as shown above, and preferably the third region 330 without limitation. In addition, the regions 310, 320 and 330 may be formed in one process. The packaging film 300 may be formed by, for example, cutting one sheet of film to have three regions 310, 320 and 330, thereby forming the regions 310, 320 and 330 in one process.

The packaging film 300 may be selected from among resin films, and a kind of the resin film is not limited. The packaging film 300 may be, for example, a film including at least one resin selected from a polycarbonate (PC)-based resin, a polyester-based resin, a polyolefin-based resin, a cyclo-olefin polymer (COP)-based resin, an acrylic resin, a urethane-based resin, an epoxy-based resin, a polyamide-based resin, a cellulose-based resin, a nylon-based resin and a derivative thereof. Particularly, the packaging film 300 may be, but is not limited to, a PC film, a polyethyleneterephthalate (PET) film, a polyethylenenaphthalate (PEN) film, a polybutyleneterephthalate (PBT) film, a polybutylenenaphthalate (PBN) film, a polyethylene (PE) film, a polypropylene (PP) film, a cyclic PE film, a cyclic PP film, an acrylic film, a TAC film and/or a nylon film. In addition, the listed films may be stretched or non-stretched. The packaging film 300 is preferably a non-stretched PC film or a non-stretched PET film.

The packaging film 300 may have light transmittance. In addition, the packaging film 300 may have optical properties including light polarizing, concentrating and/or diffusing properties as needed, and in some cases, may have isotropy. At least the first region 310 can have such characteristics. In this case, the first region can be useful in packaging of the optical diode 200A.

In the present application, isotropy means that the film does not have retardation, or only has insignificant retardation to an extent that does not have a substantial influence on a phase of light transmitted through the film.

The packaging film 300 may have an in-plane retardation ($R_{in}$) of 30 nm or less according to the first embodiment of the present application. When the in-plane retardation ($R_{in}$) exceeds 30 nm, it can have an influence on a phase of light transmitted through the film 300. The packaging film 300 may have, for example, an in-plane retardation ($R_{in}$) calculated by Equation 1 of 30 nm or less, 25 nm or less, or 10 nm or less, and particularly, for example, 0 to 25 nm, 0 to 10 nm, 0.1 to 5 nm, 0.2 to 3 nm, or 0.5 to 2 nm In addition, the packaging film 300 may have a thickness-direction retardation ($R_{th}$) of 35 nm or less according to the second embodiment of the present application. When the thickness-direction retardation ($R_{th}$) exceeds 35 nm, it can have an influence on a phase of light transmitted through the film 300. The packaging film 300 may have, for example, a thickness-direction retardation ($R_{th}$) calculated by Equation 2 of 35 nm or less, 30 nm or less, 20 nm or less, or 10 nm or less, and particularly, for example, 0 to 30 nm, 0 to 20 nm, 0 to 10 nm, 0.1 to 5 nm, or 0.2 to 3 nm. In the present application, the retardations ($R_{in}$ and $R_{th}$) have absolute values.

$$R_{in}=d\times(nx-ny) \quad \text{[Equation 1]}$$

In Equation 1, $R_{in}$ is thickness-direction retardation, d is a thickness of the packaging film 300, nx is a refractive index along a slow axis of the packaging film 300 with respect to light with a wavelength of 400 to 600 nm, and ny is a refractive index along a fast axis of the packaging film with respect to light with a wavelength of 400 to 600 nm $$R_{th}=d\times(ny-nz) \quad \text{[Equation 2]}$$

In Equation 2, $R_{th}$ is thickness-direction retardation, d is a thickness of the packaging film 300, ny is a refractive index along a fast axis of the packaging film 300 with respect to light with a wavelength of 400 to 600 nm, and nz is a refractive index in a thickness direction of the packaging film with respect to light with a wavelength of 400 to 600 nm.

The packaging film 300 may be selected from, for example, a non-stretched PC-based film, a non-stretched polyester-based film, a non-stretched acrylic film, a non-stretched TAC-based film and/or a non-stretched cyclic polyolefin-based film to satisfy such retardation.

During packaging of the backward diode 200, the regions 310, 320 and 330 are bent at boundary lines C1 and C2. In the drawings, the boundary lines C1 and C2 between the areas 310, 320 and 330 are represented by dotted lines. Here, the boundary lines C1 and C2 are represented for convenience of description, and thus may or may not actually be visible on the packaging film 300.

To package the backward diode 200 using the packaging film 300, for example, first, the first region 310 is placed to correspond to a top surface 201 of the backward diode 200, and the second region 320 is placed to correspond to a side surface 202 of the backward diode 200 by bending the second region 320 on the first boundary line C1. In addition, when the third region 330 is further included, the third region 330 is placed to correspond to the bottom surface 203 of the backward diode 200 by bending the third region 330 on the second boundary line C2 before packaging.

According to an exemplary embodiment, the packaging film 300 and the backward diode 200 may have adhesive strength to each other. The adhesive strength may be present, for example, at a contact interface between the packaging film 300 and the backward diode 200. A method of adhering the packaging film 300 to the backward diode 200 is not specifically limited, and may be performed, for example, by applying a thermal and/or optical laminating method. For example, the packaging film 300 may be fused to the backward diode 200 by applying heat or radiating light to the packaging film 300. Here, in the packaging film 300, at least one selected from the second region 320 and the third region 330 may have adhesive strength to the backward diode 200. During adhesion through lamination, conditions for radiating heat or light may be suitably selected according to a kind of the packaging film 300, but the present application is not specifically limited thereto.

In another embodiment of the present application, the packaging film 300 and the backward diode 200 may have adhesive strength therebetween through a separate adhesive means. The adhesive means may be, for example, a pressure-sensitive adhesive layer (not shown) formed between the packaging film 300 and the backward diode 200. To discriminate such a pressure-sensitive adhesive layer from a pressure-sensitive adhesive layer 400 formed between the packaging film 300 and the display panel 100, the pressure-sensitive adhesive layer is referred to as a second pressure-sensitive adhesive layer.

The second pressure-sensitive adhesive layer is preferably formed at a contact interface between the packaging film 300 and the backward diode 200 and provides adhesive strength therebetween. Such a second pressure-sensitive adhesive layer may be coated on the packaging film 300 and/or the backward diode 200. For example, the second pressure-sensitive adhesive layer may be formed on at least one selected from the second region 320 and the third region 330. Particularly, the second pressure-sensitive adhesive layer may be formed on an inner surface of at least the second region 320 and/or the third region 330 of the regions 310, 320 and 330 of the packaging film 300.

As described above, the packaging film 300 and the backward diode 200 may be adhered between at least the second region 320 and the side surface 202 and/or between the third region 330 and the back surface 203 through fusion by heat and/or light or adhesion using the second pressure-sensitive adhesive layer.

In addition, the adhesive means may be, for example, a double-sided or single-sided pressure-sensitive adhesive tape. Here, the double-sided pressure-sensitive adhesive tape may be interposed between the packaging film 300 and the backward diode 200. Particularly, the double-sided pressure-sensitive adhesive tape may be interposed between the second region 320 and the side surface 202, and/or between the third region 330 and the bottom surface 203. In addition, for example, an outer surface of the third region 330 may be taped with the single-sided pressure-sensitive adhesive tape to provide binding strength to the backward diode 200.

Figure 5:
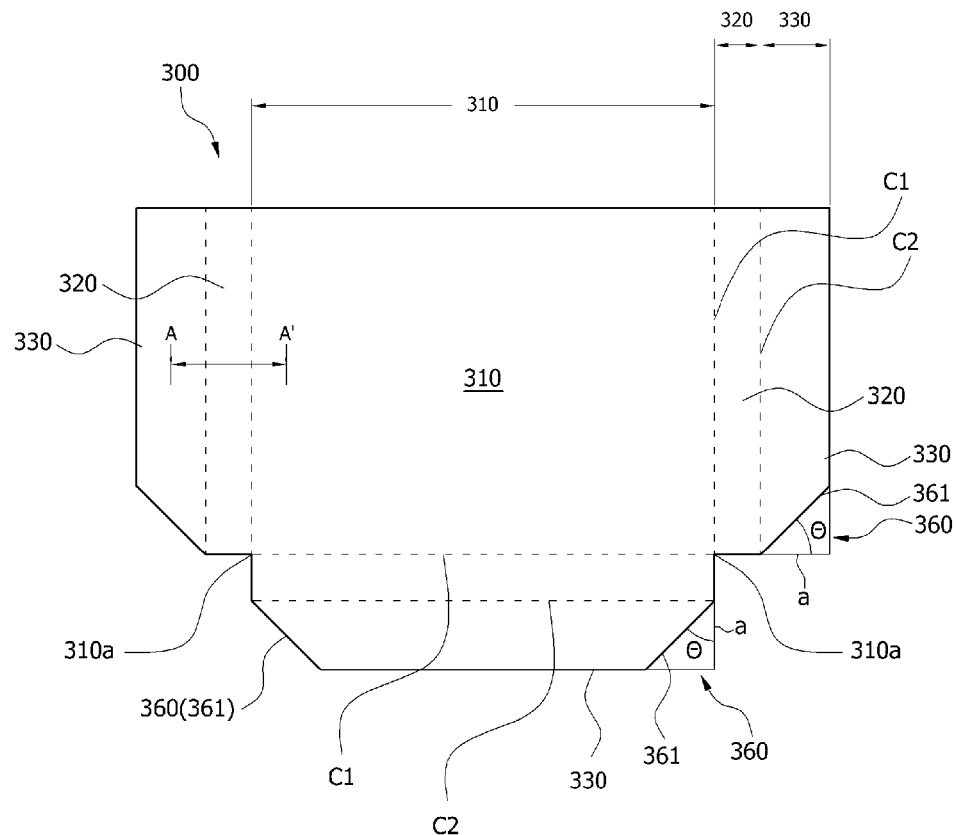
FIG. 5 is a plan view of a packaging film according to an embodiment of the present application.
Figure 6:
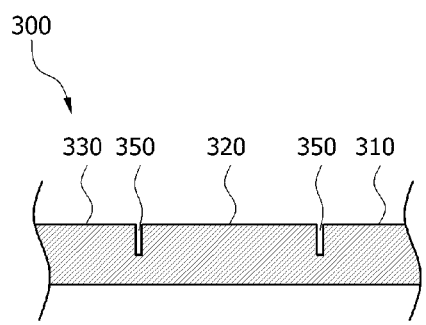
FIG. 6 is a cross-sectional view taken along line A-A' of FIG. 5.

Referring to FIGS. 5 and 6, according to a third embodiment of the present application, a notch part 350 may be formed on a boundary line C1 between the first region 310 and the second region 320. In addition, when the packaging film 300 further includes a third region 330, the notch part 350 may also be formed on a boundary line C2 between the second region 320 and the third region 330. FIG. 6 is a cross-sectional view taken along line A-A' of FIG. 5.

In the present application, the notch part 350 may be any one processed to easily bend the second region 320 and the third region 330 on the boundary lines C1 and C2, respectively. The notch part 350 may be formed through, for example, notch treatment capable of generating a thickness difference between the boundary lines C1 and C2. Particularly, the notch part 350 may be selected from imprinted parts formed by pressing the boundary lines C1 and C2, and half-cut parts formed by half-cutting the boundary lines C1 and C2. In the present application, "half" does not mean only a half of the thickness of the packaging film 300.

The notch part 350 may be formed to a depth of, for example, ⅓ to ⅔ of the thickness of the packaging film 300 through folding line imprinting or half-cutting. Here, when the depth of the notch part 350 is less than ⅓, for example, in some cases, breakage may occur. When the depth is more than ⅔, it may be somewhat difficult to bend.

In addition, the notch part 350 may be continuously formed along the boundary lines C1 and C2, or discontinuously formed at a predetermined interval. That is, the notch part 350 may be discontinuously formed by a dotted line representing the boundary lines C1 and C2. In another example, the notch part 350 may be selected from a plurality of micropores perforated at a predetermined interval along the boundary lines C1 and C2, and in the present application, the notch part 350 may be, but is not specifically limited to, any one processed to easily bend the regions 310, 320 and 330 on each boundary line C1 or C2 as described above.

In addition, the regions 310, 320 and 330 may have a bending strength of, for example, 1.0 to 10.0 gf on each boundary line C1 or C2. Such bending strength may be set by the notch part 350. Here, when the bending strength is less than 1.0 gf, the regions 310, 320 and 330 are easily bent on the boundary line C1 or C2 or overlapped, and thus can be difficult to handle. In addition, when the bending strength is more than 10.0 gf, a bending process may not be facilitated. Considering these, the regions 310, 320 and 330 may have a bending strength of, for example, 2 to 8 or 3 to 6 gf on each boundary line C1 or C2. The bending strength may be, for example, a value measured according to ASTM D790.

The thickness of the packaging film 300 is not specifically limited. The thickness of the packaging film 300 may be variously set in consideration of supporting strength, bending processability of each region 310, 320 or 330, handleability in packaging, and/or thinning of the film 300.

According to a fourth embodiment of the present application, the thickness of the packaging film 300 may satisfy an area of the first region 310 and Equation 3.

$$T \, [\mu m] = 100 \times S \, [m^2] + a \quad \text{[Equation 3]}$$

In Equation 3, T is a thickness (unit: μm) of the packaging film 300, S is an area (width×length, unit: $m^2$) of the first region 310, and a is a number from 15 to 130. Here, a includes a decimal as well as an integer.

When the thickness of the packaging film 300 satisfies Equation 3, it is advantageous in terms of the supporting strength, the bending processability of each region 310, 320 and 330, handleability in packaging, and/or the thinning of the film 300.

In Equation 3, S is an area of the first region 310, which may also be an area of the top surface of the backward diode 200 corresponding to the first region 310. In another example, S of Equation 3 may be an area of a top surface of the display panel 100. Generally, a display device such as a TV or a monitor may be inclined toward a wall at an angle of approximately 10 degrees when equipped on the wall. Here, when the thickness of the packaging film 300 is too small to satisfy Equation 3, the packaging film 300 may droop or project forward due to low supporting strength. In addition, when the thickness of the packaging film 300 is too large to satisfy Equation 3, the bending processability of each region 310, 320 or 330 may decrease due to unnecessarily high strength, and a separated part may be generated after bending, which may be disadvantageous to thinning of the film. Considering this, it is preferable that thickness of the packaging film 300 satisfy Equation 3.

The thickness of the packaging film 300 may vary depending on the area of the first region 310, and the thickness may be, for example, in the range from approximately 20 to 500 μm, 30 to 400 μm, or 35 to 200 μm.

In addition, according to a fifth embodiment of the present application, the packaging film 300 may have at least one physical property selected from (a) a tensile modulus of 1,200 MPa or more, (b) a tensile strength of 40 MPa, and (c) an elongation of 20%. When the packaging film 300 has such a physical property, the backward diode 200 may be packaged and supported well.

Although this differs depending on the backward diode 200, for example, when a tensile modulus is less than 1,200 MPa or a tensile strength is less than 40 MPa, supporting strength of the backward diode 200 may become insignificant. The upper limits of the tensile modulus and the tensile strength are not specifically limited. Particularly, the packaging film 300 may have a tensile modulus of 1,200 to 5,000 MPa, 1,500 to 4,000 MPa, 1,800 to 3,000 MPa, 1,900 to 2,500 MPa, or 2,000 to 2,400 MPa. In addition, the packaging film 300 may have, for example, a tensile strength of 40 to 200 MPa, 45 to 150 MPa, 50 to 100 MPa, or 55 to 75 MPa. Moreover, when an elongation is less than 20%, for example, the handleability in packaging may be degraded. The upper limit of the elongation is not limited, but in consideration of the supporting strength of the backward diode 200, for example, the elongation may be 200% or less. Considering this, the packaging film 300 may have, for example, an elongation of 20% to 200%, 30% to 180%, 50% to 180%, or 80% to 150%.

Methods of measuring the tensile modulus, tensile strength and elongation are not limited. For example, the tensile modulus and the tensile strength may be values measured by a tensile tester generally used in the film manufacturing field. In addition, the elongation may be a value calculated through an equation [Elongation (%)=(A−B)/A×100] by setting an initial gauge length of the film 300 as A and a gauge length at a broken time after elongation as B in a tensile tester.

In addition, the packaging film 300 preferably has small strain for high supporting strength, fixing strength and/or durability. The packaging film 300 may have a strain (E) obtained by Equation 4 according to a sixth embodiment of the present application.

$$E \, (\%) = [(L2 - L1)/L1] \times 100 \quad \text{[Equation 4]}$$

In Equation 4, L1 is an initial length (width or length) of the packaging film 300, and L2 is an extended length of the packaging film 300 after being maintained for 24 hours while applying a load of 3 kg at 80° C.

As described above, the display device may be inclined toward a wall at an angle of approximately 10 degrees. Here, when the strain of the packaging film 300 according to Equation 4 is more than 5%, the packaging film may droop or project forward due to a load of the display device. Particularly, the packaging film 300 may have a strain (E) of 4% or less, 3.5% or less, 3.2% or less, 3% or less, 2.5% or less, 2% or less, 1.5% or less, or 1% or less. It is preferable that the strain (E) of the packaging film 300 be closer to 0.

In one example, the packaging film 300 may be selected from films which are elongated approximately 2 mm or less in a length or width direction, when maintained at 80° C. under a load of 3 kg for 24 hours, based on a size of 60 mm×25 mm (width×length).

Moreover, the packaging film 300 may have folding endurance, when a folding number (MIT) measured by a test defined by JIS P8115 is, for example, 200 times or more, 300 times or more, or 400 times or more.

In addition, referring to FIG. 5, according to a seventh embodiment of the present application, the third region 330 may have an overlap preventing part 360. That is, the overlap preventing part 360 may be formed in the third region 330 to prevent overlap between adjacent third regions 330 when the third region 330 is bent to be adhered to the bottom surface 203 of the backward diode 200.

The overlap preventing part 360 may be selected from a notched part 361 cut, for example, at a predetermined angle (θ). Here, the angle (θ) of the notched part 361 may be, for example, 15 to 85 degrees or 30 to 60 degrees. Particularly, the angle (θ) of the notched part 361 may be 30 degrees or more, or 45 degrees of more. Due to such a notched part 361, the overlapping of the adjacent third regions 330 may be prevented. In the present application, as shown in FIG. 5, the angle (θ) of the notched part 361 is an angle of incline between an extension line a and a side surface of the third region 360 based on the extension line (a) extending in a straight line direction in the second region 320.

Figure 7:
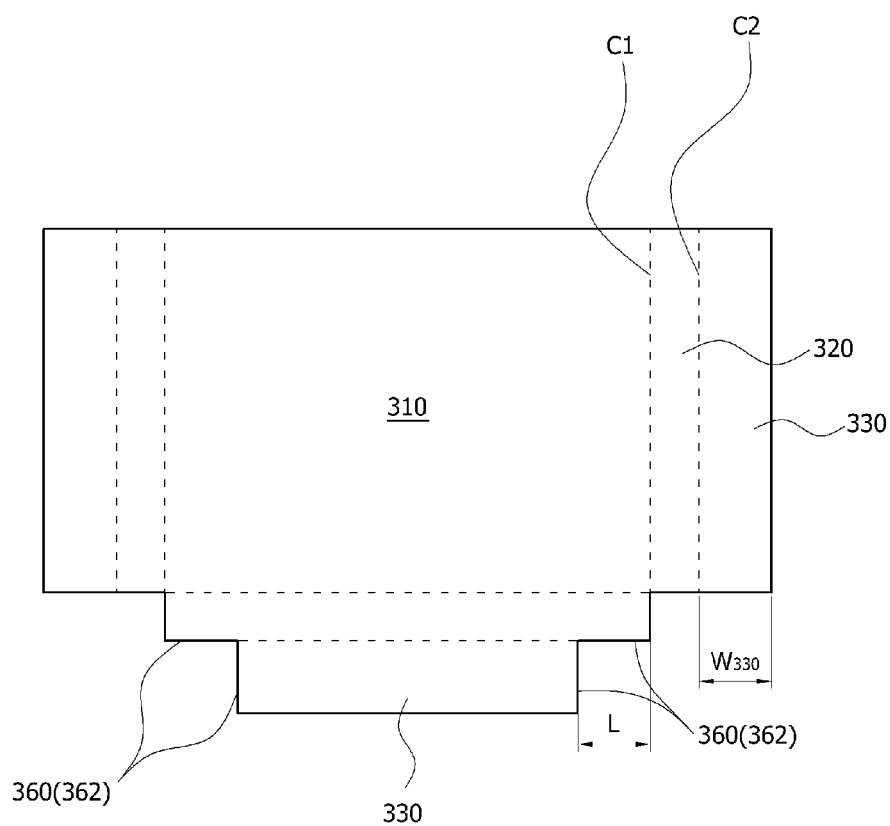
FIG. 7 is a plan view of a packaging film according to an embodiment of the present application.

FIG. 7 shows the overlap preventing part 360 according to another embodiment. Referring to FIG. 7, the overlap preventing part 360 may be selected from cut parts 362 cut or removed in a predetermined length L. Here, the length L of the cut part 362 may be, for example, larger than or the same as a width ($W_{330}$) of the third region 330. The overlapping of the adjacent third regions 330 may be prevented by such a cut part 362.

According to an exemplary embodiment, among the regions 310, 320 and 330, at least the first region 310 may have light transmittance (transparency). The first region 310 may have, for example, a light transmittance of 80% or more, particularly, 90% or more. In this case, it is advantageous to package the optical diode 200A.

In addition, according to an eighth embodiment of the present application, among the second and third regions 320 and 330, at least the second region 320 may have light impermeability. That is, since the second region 320 has light transmittance, light leakage to the side surface thereof may be prevented. The second region 320 may have a light impermeability of, for example, 10% or less, 5% or less, 1% or less, 0.1% or less, or 0%. In the present application, the light impermeability includes a light shielding property of blocking light and/or a light reflecting property of reflecting light. For such light impermeability, at least the second region 320 may include, for example, at least one light leakage preventing layer selected from a light shielding layer and a reflective layer. In addition, the third region 330 may also selectively have light impermeability.

The light shielding layer may be formed, for example, by coating a light shielding material on the second region 320. In addition, the reflective layer may be formed by, for example, a reflective material may be coated on the second region 320. The term "coating" used herein includes a coating method such as printing or deposition, in addition to, general coating such as bar coating or spray coating.

Materials constituting the light shielding or reflective layer are not specifically limited. A light shielding material may be a material exhibiting a color such as black, and particularly, an inorganic or organic material selected from carbon black, graphite, iron oxide, an azo-based pigment and/or a phthalocyanine-based pigment. In addition, the reflective material may be, for example, a metal or metal oxide selected from aluminum, titanium, silica, alumina and/or titania. Such light shielding and reflective materials may be blended with a binder and/or solvent and coated by printing. In addition, the metal or metal oxide for reflectivity may be coated through deposition.

Figure 8:
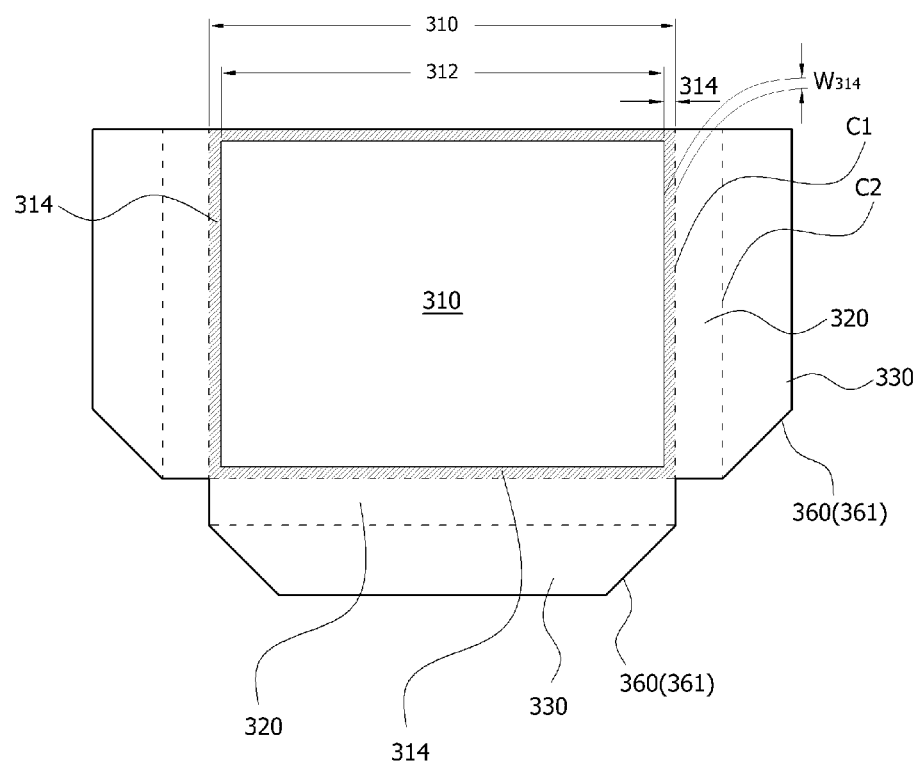
FIG. 8 is a plan view of a packaging film according to an embodiment of the present application.

Referring to FIG. 8, according to a ninth embodiment of the present application, a light impermeable part 314 may be formed at an edge of the first region 310. Particularly, as shown in FIG. 8, the first region 310 may have a main transparent region 312, and also have a light impermeable part 314 formed along the edge thereof. The light impermeable part 314 may have light impermeability (light leakage preventability). For example, the light impermeable part 314 may be selected from a printed layer formed by printing a light impermeable paint. Moreover, the light impermeable part 314 may be selected from the above-described light shielding and reflective layers. For example, the light impermeable part 314 may be formed by coating a light shielding material (colored material) such as an inorganic or organic material selected from carbon black, graphite, iron oxide, an azo-based pigment and a phthalocyanine-based pigment.

When the light impermeable part 314 is formed at the edge of the first region 310 as described above, light leakage to the side surface may be completely prevented. Although the light leakage to the side surface is prevented due to the light impermeability of the second region 320, it may occur and there may be allowance in some cases, for example, if the packaging film 300 is not exactly bent on the boundary lines C1 and C2. In addition, during the packaging of the packaging film 300, the first region 310 is lopsided, and thus the edge of the first region 310 is located on a side surface of the optical diode 200A, thereby generating light leakage to the side surface. In such a case, the light leakage to the side surface may be completely prevented since light is shielded in the light impermeable part 314.

A width ($W_{314}$) and a thickness of the light impermeable part 314 are not specifically limited. The width ($W_{314}$) may be, for example, 0.01 mm or more. Here, the width ($W_{314}$) is less than 0.01 mm, a function of preventing allowance may be insignificant. The upper limit of the width is not specifically limited, but when the width ($W_{314}$) is too large, a screen may be excessively covered, and thus the width is preferably, for example, 10 mm or less. In consideration of this, the light impermeable part 314 may have a width ($W_{314}$) of, for example, 0.02 to 5 mm, and particularly, for example, 0.03 to 3 mm. In addition, an area of the light impermeable part 314 may be, for example, 0.01 to 5%, and particularly, 0.5 to 2% of a total area of the first region. In addition, a thickness of the light impermeable part 314 may be, for example, 200 μm or less, and particularly, for example, 0.01 to 200 μm, or 0.02 to 100 μm.

Figure 9:
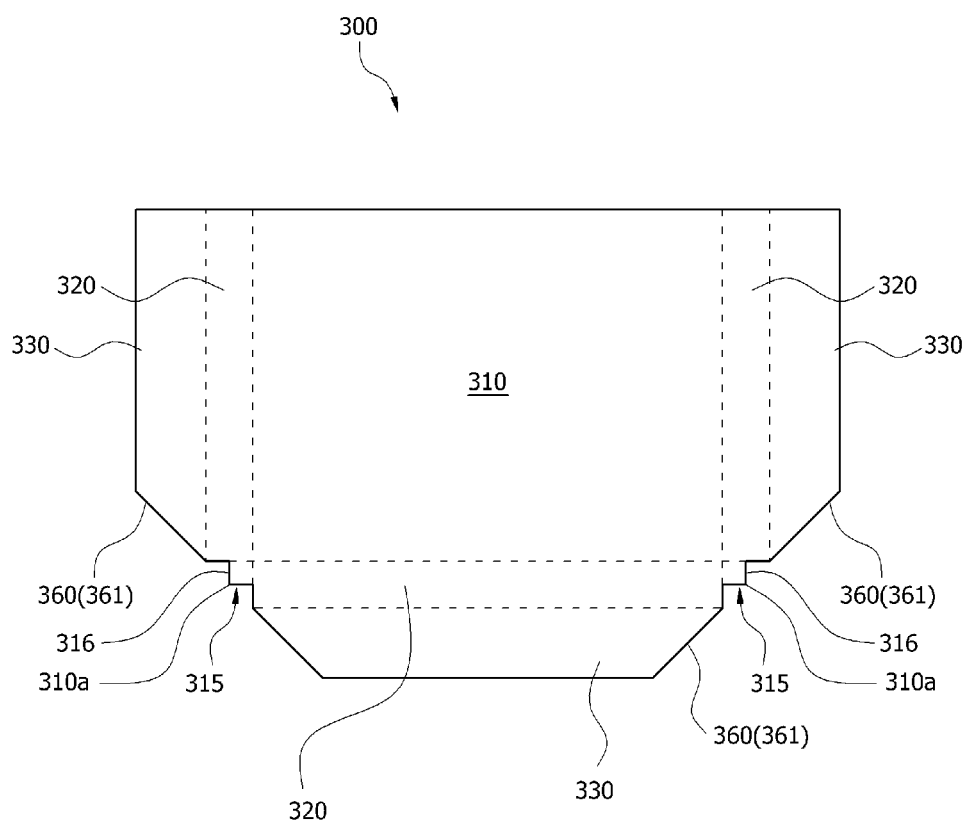
FIG. 9 is a plan view of a packaging film according to an embodiment of the present application.

Referring to FIG. 9, according to a tenth embodiment of the present application, the first region 310 may include a projected part 315 in which the second region 320 does not extend. Particularly, as shown in FIG. 9, the second region 320 may extend from the first region 310, not from a vertex 310a thereof, to have a step difference 316, and thus the first region 310 may include a projecting part 315. That is, the vertex 310a of the first region 310 may be projected.

When the projected part 315 is included as described above, that is, when the projected part 315 in which the second region 320 does not extend from the first region 310 is included, stress caused in the bending of the second region 320 may be prevented. Although this depends on mechanical properties or thickness of the packaging film 300, as shown in FIG. 5, when there is no projected part 315 formed by projecting a vertex 310a, a part around the vertex 310a of the first region 310 may become separated by applying stress when the second region 320 is bent. However, when the projected part 315 is included, the separation phenomenon may be prevented.

Referring to FIGS. 2 to 4, the packaging film 300 is adhered and fixed to the display panel 100 through a pressure-sensitive adhesive layer 400.

According to an eleventh embodiment of the present application, adhesive surface treatment may be performed on a top surface of the packaging film 300. Particularly, an adhesive surface treated part may be formed on a top surface of at least the first region 310, that is, a surface (an upper surface in the drawing) in contact with the pressure-sensitive adhesive layer 400. In the present application, the adhesive surface treatment is not limited as long as it can improve adhesive strength between the packaging film 300 and the pressure-sensitive adhesive layer 400. Due to such adhesive surface treatment, adhesive strength is improved at a contact interface between the packaging film 300 and the pressure-sensitive adhesive layer 400, and thus fixing strength between the display panel 100 and the packaging film 300 is increased.

The adhesive surface treatment may be at least one selected from, for example, corona treatment and primer treatment. Methods for the corona treatment and the primer treatment are not specifically limited, and may be arbitrary known methods for improving adhesive strength in film processing. For example, the primer treatment may be a method of forming a primer layer by coating an acryl-based, urethane-based, or epoxy-based primer. In addition, the primer layer may have a thickness of, for example, 0.01 to 50 μm.

In addition, according to a twelfth embodiment of the present application, a bottom surface of the packaging film 300 may have a ribbed surface. Particularly, a ribbed surface may be formed on a bottom surface of the first region 310, that is, a surface (a lower surface in the drawing) in contact with the backward diode 200. Due to such a ribbed surface, after packaging, fusion between the first region 310 and the backward diode 200 may be prevented. More particularly, referring to FIG. 3, the fusion between a bottom surface (lower surface in the drawing) of the first region 310 and a top surface (upper surface in the drawing) of a brightness enhancing film 230 may be prevented.

The ribbed surface may be formed by various methods, for example, a mat treatment and a haze treatment. By such a treatment, the ribbed surface may have a roughness, for example, an RMS roughness, of, for example, 0.1 μm or more, 0.5 μm or more, or 1.0 μm or more, and preferably, for example, approximately 0.1 to 10 μm, 0.5 to 8 μm, or 1.0 to 5 μm. In addition, the ribbed surface may have a haze of 80% or less, or 70% or less, and preferably, approximately 40% to 80% or 50% to 70%.

In addition, according to a case, the ribbed surface may be a high-hardness surface having high hardness, for example, pencil hardness of 1 B or more, or 2 B or more, and preferably, approximately 1 B to 4 B or 2 B to 4 B.

When the ribbed surface has a roughness (RMS roughness) and/or a pencil hardness in the above-exemplified ranges, the fusion between the first region 310 and the backward diode 200 may be effectively prevented.

In addition, the ribbed surface may be formed using, for example, a resin layer. For example, in the process of forming a resin layer, the ribbed surface may be formed by an imprinting process or a method of transferring a rib-shaped cast, or a method of including beads which can form ribs in a resin layer having a suitable thickness.

The resin layer may include, for example, a room temperature-curable, moisture-curable, heat-curable or photocurable resin composition in a cured state. In one example, the resin layer may include a heat-curable or photocurable resin composition, or include a photocurable resin composition in a cured state. Here, the room temperature-curable, moisture-curable, heat-curable or photocurable resin composition may refer to a resin composition cured at room temperature, or in suitable humidity, by applying heat or radiating active energy rays.

For example, the resin composition may include an acryl compound, an epoxy compound, a urethane compound, a phenol compound or a polyester compound as a main material. Here, the "compound" may be a monomer, oligomer or polymer compound.

In another example, as the resin composition, an acrylic resin composition having an excellent optical property such as transparency and excellent resistance to yellowing, for example, a photocurable acrylic resin composition, may be used. The photocurable acrylic composition may include, for example, an active energy ray-polymerizable polymer component and a reactive monomer for dilution.

Here, as the polymer component, a component known as a so-called active energy ray-polymerizable oligomer such as urethane acrylate, epoxy acrylate, ether acrylate or ester acrylate, or a polymerized product of a mixture including a monomer such as a (meth)acrylic acid ester monomer may be used. Here, as the (meth)acrylic acid ester monomer, an alkyl(meth)acrylate, a (meth)acrylate having an aromatic group, a heterocyclic(meth)acrylate or an alkoxy(meth)acrylate may be used.

As the reactive monomer for dilution which can be included in the photocurable acrylic composition, a monomer having one or at least two photocurable functional groups, for example, an acryloyl group, a methacryloyl group, etc. may be used. As the reactive monomer for dilution, for example, the (meth)acrylic acid ester monomer or a multifunctional acrylate may be used.

Selection of the component to prepare the photocurable acrylic composition or a ratio of blending the selected component is not specifically limited, and may be controlled in consideration of hardness and other physical properties of a desired resin layer.

Ribs may be formed in the resin layer by a suitable method in the process of forming a resin layer using the resin composition, or a ribbed surface may be embodied by including beads in the resin layer. Here, when beads are included, the beads may have a refractive index different from or substantially equal to that of the resin layer. When the beads have a refractive index different from that of the resin layer, a subsidiary effect of inducing light diffusion through the resin layer may also be obtained.

A shape of the beads included in the resin layer may be, but is not specifically limited to, for example, a spherical, oval, polygonal, or amorphous shape, or another shape. As a particular kind of beads, various inorganic or organic beads may be used. As inorganic beads, silica, amorphous titania, amorphous zirconia, indium oxide, alumina, amorphous zinc oxide, amorphous cerium oxide, barium oxide, calcium carbonate, amorphous barium titanate or barium sulfate may be used, and as organic beads, particles including a crosslinked or non-crosslinked product of an organic material such as an acrylic resin, a styrene resin, a urethane resin, a melamine resin, a benzoguanamine resin, an epoxy resin or a silicon resin may be used, but the present application is not limited thereto.

In addition, a method of forming a ribbed surface in the resin layer without using beads is not specifically limited. For example, the ribbed surface may be embodied by curing the resin composition in a state in which a coating layer of the resin composition is in contact with a mold having a desired ribbed structure, or by an imprinting method.

In some cases, a resin composition is prepared for the resin layer to have high hardness, and allows the resin layer to serve as a high-hardness layer. In this case, the resin layer may be controlled to have hardness, for example, pencil hardness, in the above-described range.

In the present application, the pressure-sensitive adhesive layer 400 may be formed between the display panel 100 and the packaging film 300 to adhesively fix them. The pressure-sensitive adhesive layer 400 may be coated on the packaging film 300, that is, the first region 310 of the packaging film 300. In addition, the pressure-sensitive adhesive layer 400 may be coated on the display panel 100, for example, on a lower polarizing plate 160. In another example, the pressure-sensitive adhesive layer 400 may be formed by a transferring method. That is, the pressure-sensitive adhesive layer 400 may be formed by being coated on a separate releasing film, and being transferred onto the display panel 100 or the packaging film 300. The pressure-sensitive adhesive layer 400 may have a light transmittance of, for example, 80% or more.

The pressure-sensitive adhesive layer 400 may be formed of a pressure-sensitive adhesive composition. Here, the pressure-sensitive adhesive composition is as follows. The pressure-sensitive adhesive composition may also be applied to a second pressure-sensitive adhesive layer, as well as the pressure-sensitive adhesive layer 400. Particularly, the pressure-sensitive adhesive composition which will be described below may also be applied to the second pressure-sensitive adhesive layer formed between the packaging film 300 and the backward diode 200 to provide adhesive strength therebetween, as well as the pressure-sensitive adhesive layer 400 formed between the display panel 100 and the packaging film 300.

In the present application, the pressure-sensitive adhesive composition includes, for example, a photocurable and/or heat-curable type. The pressure-sensitive adhesive composition may include, for example, a monomer and/or polymer component. The monomer and polymer components may form a base of the pressure-sensitive adhesive layer through curing. The term "polymer" used herein refers to a compound prepared by polymerizing at least two monomers, and also includes, for example, a component generally called an oligomer. In the field of preparing pressure-sensitive adhesives, various monomer and polymer components used to prepare pressure-sensitive adhesive compositions are known, and such components are not limited. The monomer and polymer include, for example, acryl-based, urethane-based, and/or epoxy-based monomers and polymers.

In the heat-curable pressure-sensitive adhesive composition, the monomer and polymer components may be, for example, acrylic monomers and polymers each having a crosslinkable functional group. The acrylic polymer may be, for example, a polymer having a weight average molecular weight (Mw) of approximately 1,500,000 or more, and a glass transition temperature of approximately −24 to −16° C. A specific kind of the polymer may be, but is not specifically limited to, a polymer conventionally used as a pressure-sensitive adhesive resin, for example, an acrylic polymer including a (meth)acrylic acid alkyl ester and a copolymerizable monomer capable of providing a crosslinkable functional group on a side chain or terminal end of the polymer. Here, as a particular example of the (meth)acrylic acid alkyl ester, an alkyl(meth)acrylate including an alkyl group having 1 to 14 carbon atoms such as methyl(meth)acrylate, ethyl(meth)acrylate, butyl(meth)acrylate or ethylhexyl (meth)acrylate may be used. In addition, as the polymer monomer, a monomer simultaneously having a copolymer functional group such as an ethylene-like double bond and a crosslinkable functional group such as a hydroxyl group, a carboxyl group, an epoxy group, an isocyanate group or an amide group may be used.

A weight ratio of each monomer included in the acrylic polymer having a crosslinkable functional group is not specifically limited, and may be controlled in consideration of initial pressure-sensitive adhesive strength, adhesive strength and cohesive strength of a desired pressure-sensitive adhesive layer. In addition, in the acrylic polymer, when needed, various copolymerizable monomers, as well as the above-described monomers, may also be included in a polymerized state. The polymer may be prepared by a general polymerization method in the art, for example, solution polymerization, photo polymerization, bulk polymerization, suspension polymerization, or emulsion polymerization.

The photocurable pressure-sensitive adhesive composition may further include a multifunctional crosslinking agent that can crosslink the polymer with an acrylic polymer. In this case, a particular kind of the crosslinking agent is not specifically limited, and may be, for example, a known crosslinking agent such as an isocyanate-based crosslinking agent, an epoxy-based crosslinking agent, an aziridine-based crosslinking agent and a metal chelate-based crosslinking agent. In addition, a ratio of the crosslinking agent in the composition is not specifically limited, and may be suitably controlled in consideration of desired cohesive strength.

The pressure-sensitive adhesive composition may be a photocurable pressure-sensitive adhesive composition according to one embodiment. The term "photocurable pressure-sensitive adhesive composition" used herein refers to a composition converted into a pressure-sensitive adhesive by inducing a curing process by light radiation, that is, radiation of electromagnetic waves. Here, the "electromagnetic waves" refer to microwaves, IR rays, UV rays, X rays, γ rays, or particle beams such as a particle beams, proton beams, neutron beams and electron beams, and conventionally UV rays or electron beams.

In the photocurable pressure-sensitive adhesive composition, the monomer and polymer component may include a photocurable oligomer and/or a reactive monomer for dilution. As the photocurable oligomer, all kinds of oligomer components used in preparation of a photocurable pressure-sensitive adhesive composition such as a UV-curable oligomer component in the art may be included. For example, the oligomer may be, but is not limited to, a urethane acrylate prepared by reaction of a polyisocyanate having at least two isocyanate groups in a molecule and a hydroxyalkyl(meth)acrylate; an ester-based acrylate prepared by dehydrating condensation of a polyester polyol and (meth) acrylic acid; an ester-based urethane acrylate prepared by reaction of an ester-based urethane resin prepared by reaction of a polyester polyol, a polyisocyanate and a hydroxyalkyl acrylate; an ester-based acrylate such as a polyalkyleneglycol di(meth)acrylate; an ether-based urethane acrylate prepared by reaction of an ether-based urethane resin prepared by reaction of a polyether polyol, a polyisocyanate and a hydroxyalkyl(meth)acrylate; or an epoxy acrylate prepared by addition reaction of an epoxy resin and (meth)acrylic acid.

As the reactive monomer for dilution, any monomer having a reactive functional group such as a (meth)acryloyl group in a molecular structure may be used without particular limitation. Such a monomer may serve to control a viscosity of the composition and embody pressure-sensitive adhesive strength after curing. Such a monomer may be, but is not limited to, an alkyl(meth)acrylate; a hydroxyl-group-containing monomer such as hydroxyethyl(meth)acrylate, hydroxypropyl(meth)acrylate or hydroxybutyl(meth)acrylate; a carboxylic acid-containing monomer such as (meth)acrylic acid or beta-carboxyethyl(meth)acrylate; an alkoxy-group-containing monomer such as 2-(2-ethoxyethoxy)ethyl(meth)acrylate; an aromatic-group-containing monomer such as benzyl(meth)acrylate or phenoxyethyl (meth)acrylate; a heterocyclic-residue-containing monomer such as tetrahydrofurfuryl(meth)acrylate or (meth)acryloyl morpholine; or a multifunctional acrylate.

Particular kinds and blending ratios of the photocurable oligomer and the reactive monomer for dilution are not specifically limited, and may be suitably selected in consideration of a viscosity of a desired composition and a pressure-sensitive adhesive property to be embodied after curing.

In another example of the photocurable pressure-sensitive adhesive composition, the monomer or polymer components may be photocurable syrups. The photocurable syrup may be a monomer mixture including a (meth)acrylic acid ester monomer such as an alkyl(meth)acrylate, or a partial polymer thereof.

The (meth)acrylic acid ester included in the monomer mixture may be, for example, an alkyl(meth)acrylate having a linear or branched alkyl group having 1 to 14 carbon atoms such as methyl(meth)acrylate, ethyl(meth)acrylate, n-propyl (meth)acrylate, isopropyl(meth)acrylate, n-butyl(meth)acrylate, t-butyl(meth)acrylate, sec-butyl(meth)acrylate, pentyl (meth)acrylate, hexyl(meth)acrylate, 2-ethylhexyl(meth) acrylate, 2-ethylbutyl(meth)acrylate, n-octyl(meth)acrylate, isooctyl(meth)acrylate, isononyl(meth)acrylate, lauryl (meth)acrylate or tetradecyl(meth)acrylate; a copolymerizable monomer capable of providing the above-described crosslinkable functional group; or another copolymerizable monomer, for example, the above-described oligomer or reactive monomer for dilution.

When the pressure-sensitive adhesive composition includes a partial polymer of the above-described monomer mixture as the syrup, a polymerizing rate of the monomer mixture or a conversion rate of the monomer is not specifically limited. For example, the polymerizing rate or conversion rate may be controlled in consideration of process efficiency or a desired pressure-sensitive adhesive property.

As another example of the photocurable pressure-sensitive adhesive composition, a pressure-sensitive adhesive composition capable of forming a pressure-sensitive adhesive layer including a so-called interpenetrating polymer network (hereinafter referred to as "IPN") is used. The term "IPN" used herein may refer to a state in which at least two crosslinked structures are present in a pressure-sensitive adhesive layer, and in one example, the crosslinked structures may be present in a state in which they are entangled with, linked to or penetrating each other. When the pressure-sensitive adhesive layer includes an IPN, the pressure-sensitive adhesive layer may have excellent durability under harsh conditions, and excellent workability or light leakage preventability.

In the pressure-sensitive adhesive composition capable of forming the pressure-sensitive adhesive layer including the IPN structure, the polymer component may be an acrylic polymer. In this case, as the acrylic polymer which can be used, an acrylic polymer used in the above-described heat-curable pressure-sensitive adhesive composition may be used. The photocurable pressure-sensitive adhesive composition may further include the multifunctional crosslinking agent and the photocurable multifunctional compound described in the category of the heat-curable pressure-sensitive adhesive composition, in addition to the acrylic polymer. Here, the photocurable multifunctional compound may mean a compound including at least two functional groups capable of being polymerized by radiation of light. The pressure-sensitive adhesive layer formed by such a composition may include, for example, a crosslinked structure including the acrylic polymer crosslinked by the multifunctional crosslinking agent and a crosslinked structure including the polymerized multifunctional compound.

As the photocurable multifunctional compound, for example, a multifunctional acrylate may be used. The multifunctional acrylate may be any compound having at least two (meth)acryloyl groups in a molecule without limitation. For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth) acrylate, or 9,9-bis[4-(2-acryloyloxyethoxy)phenyl]fluorine; a trifunctional acrylate such as trimethylolpropane tri(meth) acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane(meth) acrylate (e.g. a reaction product of an isocyanate monomer and trimethylolpropane tri(meth)acrylate). In some cases, the multifunctional acrylate may be a photocurable oligomer known in the art, which may be any kind of urethane acrylate, polycarbonate acrylate, polyester acrylate, polyether acrylate or epoxy acrylate.

Ratios of the acrylic polymer, crosslinking agent and photocurable multifunctional compound in the pressure-sensitive adhesive composition are not specifically limited, and may be controlled by physical properties of a desired pressure-sensitive adhesive.

The pressure-sensitive adhesive composition may further include a radical initiator such as a photoinitiator or a thermal initiator, in addition to the components described above, and a conventional photo radical initiator. As the photo radical initiator, any one capable of generating radicals by radiation of electromagnetic waves and initiating a curing reaction may be used without specific limitation. A ratio of the radical initiator is not specifically limited either, and may be selected within a range capable of inducing a suitable curing reaction of photocurable components included in the composition.

In addition, the pressure-sensitive adhesive composition may further include at least one additive selected from the group consisting of a silane coupling agent, a pressure-sensitive adhesion providing resin, an epoxy resin, a curing agent, a UV stabilizer, an antioxidant, a coloring agent, a reinforcing agent, a filler, a foaming agent, a surfactant, and a plasticizer as needed.

A method of forming the pressure-sensitive adhesive layer using such a pressure-sensitive adhesive composition is not particularly limited. In the process of forming the pressure-sensitive adhesive layer, a curing process may be performed by application of heat and/or radiation of light, and the curing process may be performed after the packaging film 300 is adhered to an adherent by the pressure-sensitive adhesive layer, that is, for example, the packaging film 300 is adhered to the display panel 100. In addition, the application of heat and radiation of light are not performed under specifically limited conditions, for example, conditions capable of ensuring characteristics of the desired pressure-sensitive adhesive layer. The radiation of light may be performed using, for example, a means such as a high pressure mercury lamp, an electrodeless lamp or a xenon lamp. In addition, a luminescence in the radiation of light may be controlled within a range of, for example, 50 to 2,000 mW/cm$^2$, and a quantity of light may be controlled within a range of 10 to 1,000 mJ/cm$^2$, but the present application is not limited thereto.

The pressure-sensitive adhesive layer 400 is formed at least between the display panel 100 and the first region 310. Here, in some cases, the pressure-sensitive adhesive layer 400 may need resistance to external force.

For example, under a high temperature and/or high humidity, a wave may be generated between the first and second regions 310 and 320 of the packaging film 300. More particularly, the first region 310 is adhered and fixed to the pressure-sensitive adhesive layer 400, and thus does not contract or expand, but the second region 320 may contract or expand under a high temperature and/or high humidity. Due to such contraction and expansion of the second region 320, waves are generated between the first and second regions 310 and 320, and stress may be generated at an edge of the first region 310 due to the waves. Here, in some cases, a separation phenomenon may occur between the first region 310 and the pressure-sensitive adhesive layer 400.

In addition, although this depends on the display panel 100 and the backward diode 200, for example, when weights of the display panel 100 and the backward diode 200 are large, the pressure-sensitive adhesive layer 400 may be resistant to shearing stress. That is, the pressure-sensitive adhesive layer 400 should ensure cohesive strength for resisting shearing stress applied by a load of the display panel 100 and the backward diode 200 not to be detached.

Considering this, the pressure-sensitive adhesive layer 400 may be selected from Examples 1 to 3 which will be described below.

(1) First Example of Pressure-Sensitive Adhesive Layer

According to the first example, the pressure-sensitive adhesive layer 400 may have a room temperature storage modulus of $6.0 \times 10^5$ dyn/cm$^2$ or more. That is, the pressure-sensitive adhesive layer 400 is formed by curing a pressure-sensitive adhesive composition, and has a storage modulus measured at room temperature after curing of $6.0 \times 10^5$ dyn/cm$^2$ or more. In the present application, the room temperature storage modulus is measured by a conventional method, and may be a value measured using, for example, a dynamic viscoelasticity measuring device. The term "room temperature" used herein is a natural temperature that is neither increased nor decreased, and may differ according to a season, but may be, for example, approximately −10 to 50° C., 5 to 40° C., 10 to 30° C., or 15 to 25° C.

When the pressure-sensitive adhesive layer 400 has a room temperature storage modulus of $6.0 \times 10^5$ dyn/cm$^2$ or more, the pressure-sensitive adhesive layer 400 may have resistance to external force. That is, a separation phenomenon between the first region 310 and the pressure-sensitive adhesive layer 400 may be prevented by absorbing stress caused by contraction or expansion under a high temperature and/or high humidity. In addition, cohesive strength corresponding to the shearing stress is also ensured, and the pressure-sensitive adhesive layer 400 matches the first region 310. Here, when the pressure-sensitive adhesive layer 400 has a room temperature storage modulus of less than $6.0 \times 10^5$ dyn/cm$^2$, the pressure-sensitive adhesive layer 400 becomes soft, and thus can absorb stress caused by contraction or expansion of the second region 320, but cohesive strength capable of corresponding to shearing strength caused by loads of the display panel 100 and the backward diode 200 may be reduced.

Since a higher room temperature storage modulus is better, the upper limit is not particularly limited, but if the room temperature storage modulus is high, an absorbance to the stress becomes lower and the separation may occur. Accordingly, the room temperature storage modulus may be, for example, $1.0 \times 10^8$ dyn/cm$^2$ or less.

In addition, in one example, the pressure-sensitive adhesive layer 400 may include a pressure-sensitive adhesive resin having a weight average molecular weight (Mw) of 1,000,000 or more. When the pressure-sensitive adhesive layer 400 includes a high molecular weight pressure-sensitive adhesive resin having a weight average molecular weight (Mw) of 1,000,000 or more, it is advantageous to improving cohesive strength. To improve the cohesive strength, that is, enhance the cohesive strength corresponding to shearing stress, a method of increasing a degree of crosslinking of a pressure-sensitive adhesive resin using a curing agent may be considered. However, when the degree of crosslinking of the pressure-sensitive adhesive resin is increased too much using a large amount of curing agents, although the cohesive strength is enhanced, the separation may occur due to a low absorbance to the stress caused by the contraction or expansion of the second region 320.

Accordingly, when a high molecular weight resin having a weight average molecular weight (Mw) of 1,000,000 or more is used as the pressure-sensitive adhesive resin, the cohesive strength of the pressure-sensitive adhesive layer 400 may be improved at a low degree of crosslinking using a small amount of a crosslinking agent. Since the pressure-sensitive adhesive resin preferably has a higher weight average molecular weight (Mw), the upper limit is not particularly limited, but the weight average molecular weight (Mw) of the pressure-sensitive adhesive resin may be, for example, 5,000,000 or less. A kind of such a pressure-sensitive adhesive rein is as described above, and may be selected from, for example, acrylic polymers as exemplified above.

In addition, when a curing agent is used, that is, a pressure-sensitive adhesive resin is included as the pressure-sensitive adhesive composition of the pressure-sensitive adhesive layer 400 in addition to the curing agent, a content of the curing agent may be 0.001 to 10 parts by weight with respect to 100 parts by weight of the pressure-sensitive adhesive resin. In addition, the pressure-sensitive adhesive resin may have a degree of crosslinking by the curing agent of 80% or less, preferably, for example, 2 to 80%. Here, when the content of the curing agent and the crosslinking degree are higher than the above ranges, the absorbance to the stress is decreased, and thus the separation may occur. In consideration of this, the pressure-sensitive adhesive layer 400 includes the pressure-sensitive adhesive resin and the curing agent, and the content of the curing agent may be 0.002 to 5 parts by weight, or 0.01 to 0.5 parts by weight with respect to 100 parts by weight of the pressure-sensitive adhesive resin. In addition, the pressure-sensitive adhesive resin may have a degree of crosslinking by the curing agent of, for example, 5% to 70%, 10% to 65%, or 20% to 60%.

According to the first Example, the pressure-sensitive adhesive layer 400 satisfies the room temperature storage modulus, the weight average molecular weight (Mw) and/or the degree of crosslinking described above, and may have sufficient cohesive strength that a dislocated distance is 1 mm or less when a vertical load of 1 kgf is applied for 4 hours to an area adhered to the packaging film 300 of 25 mm×25 mm (width×length) at room temperature or 80° C. The dislocated distance is preferably, for example, 0.001 to 1 mm (2) Second Example of Pressure-Sensitive Adhesive Layer According to the second example, the pressure-sensitive adhesive layer 400 may have a peeling strength (adhesive strength) to the packaging film 300 of 0.8 kgf/cm when peeled at a peeling rate of 30 mm/min at room temperature.

When the pressure-sensitive adhesive layer 400 has the above-described peeling strength (adhesive strength), it is strongly adhered to a contact surface to the packaging film 300, and the separation due to waves caused by the contraction or expansion of the second region 320 may be prevented. In addition, the pressure-sensitive adhesive layer 400 and the packaging film 300 resist the shearing stress caused by loads of the display panel 100 and the backward diode 200, and thus are not dislocated.

In the present application, the peeling strength (adhesive strength) is measured by a conventional method of measuring peeling strength used in the field of pressure-sensitive adhesives, and may be a value measured at a peeling strength of, for example, 180 degrees. The upper limit of the peeling strength (adhesive strength) is not particularly limited, and may be, for example, 5.0 kgf/cm or less. Meanwhile, the pressure-sensitive adhesive layer 400 may have a room temperature storage modulus of $6.0 \times 10^5$ dyn/cm$^2$ or less with the peeling strength as described above.

In addition, in one example, the pressure-sensitive adhesive layer 400 includes an acrylic copolymer as a pressure-sensitive adhesive resin, and may have a weight average molecular weight (Mw) of 1,000,000 or more for the above-described reason. Here, the acrylic copolymer may contain a crosslinked monomer at 0.1 to 10 parts by weight with respect to 90 to 99.9 parts by weight of a (meth)acrylic acid ester-based monomer having an alkyl group.

A particular kind of the (meth)acrylic acid ester-based monomer contained in the acrylic copolymer is not specifically limited. Here, when the alkyl group contained herein becomes too long, there is concern of the cohesive strength decreasing. Thus, it is preferable that a monomer having an alkyl group having 1 to 12 carbon atoms be used to maintain cohesive strength under a high temperature and/or high humidity. Such a monomer may be at least one selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl(meth)acrylate and isononyl(meth)acrylate.

In addition, the (meth)acrylic acid ester-based monomer is included at 90 to 99.9 parts by weight with respect to the acrylic copolymer. Here, when the content of the (meth)acrylic acid ester-based monomer is less than 90 parts by weight, initial adhesive strength of the pressure-sensitive adhesive may be degraded, and when the content of the (meth)acrylic acid ester-based monomer is more than 99.9 parts by weight, cohesive strength may be decreased.

In addition, the crosslinked monomer contained in the acrylic copolymer is not particularly limited as long as it contains a crosslinkable functional group, and may be at least one selected from the group consisting of a hydroxyl-group-containing monomer, a carboxyl-group-containing monomer and a nitrogen-containing monomer. Such a crosslinked monomer is reacted with a crosslinking agent to form a crosslinked structure, and thus cohesive strength and adhesive strength may be provided to prevent breakage of the cohesive strength of the pressure-sensitive adhesive under a high temperature and/or high humidity.

As the crosslinked monomer, the hydroxyl-group-containing monomer may be at least one selected from 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethyleneglycol(meth)acrylate and 2-hydroxypropyleneglycol(meth)acrylate, the carboxyl-group-containing monomer may be at least one selected from (meth)acrylic acid, an acrylic acid dimer, itaconic acid, maleic acid, maleic acid anhydride and fumaric acid, or the nitrogen-contained monomer may be at least one selected from acryl amide, N-vinylpyrrolidone and N-vinyl caprolactone.

The crosslinked monomer may be included at 0.1 to 10 parts by weight in the acrylic copolymer. Here, when the content of the crosslinked monomer is less than 0.1 parts by weight, breakage of cohesion may occur under a high temperature and/or a high temperature and humidity, and when the content is more than 10 parts by weight, a surface transfer phenomenon may occur due to a decrease in compatibility, a flowing characteristic may be decreased and/or stress relaxation may be degraded due to an increase in cohesive strength.

In addition, the acrylic copolymer may further contain a copolymerizable monomer. The copolymerizable monomer may be added to control a glass transition temperature and provide other functionalities. Such a copolymerizable monomer may be, but is not limited to, at least one selected from acrylonitrile, a nitrogen-containing monomer such as (meth)acrylamide, N-methyl(meth)acrylamide and/or N-butoxy methyl(meth)acrylamide; a styrene-based monomer such as styrene and/or methyl styrene; glycidyl(meth)acrylate; and vinyl acetate.

Here, the copolymerizable monomer may be contained at 40 parts by weight with respect to 90 to 99.9 parts by weight of the (meth)acrylic acid ester-based monomer. When the content of the copolymerizable monomer is more than 40 parts by weight, flexibility and/or peeling strength of the pressure-sensitive adhesive composition may be degraded.

According to a more particular exemplary embodiment, the pressure-sensitive adhesive layer 400 includes an acrylic copolymer as a pressure-sensitive adhesive resin. The acrylic copolymer may contain 5 to 40 parts by weight of methyl(meth)acrylate, 5 to 40 parts by weight of a copolymerizable monomer, and 0.1 to 1.0 parts by weight of a crosslinked monomer with respect to 50 to 99 parts by weight of a (meth)acrylic monomer having an alkyl group having 4 to 12 carbon atoms. Kinds of the components constituting such an acrylic copolymer are described above. When the acrylic copolymer composed as described above is included, it is preferable to improving physical properties such as peeling strength (adhesive strength) and/or a room temperature storage modulus.

In addition, the pressure-sensitive adhesive composition for the pressure-sensitive adhesive layer 400 may further include 0.01 to 10 parts by weight of a crosslinking agent with respect to 100 parts by weight of the acrylic copolymer, in addition to the acrylic copolymer as described above. The crosslinking agent is reacted with a crosslinked monomer included in the acrylic copolymer to serve to control a pressure-sensitive adhesive characteristic of the pressure-sensitive adhesive composition and enhance cohesive strength. A particular kind of the crosslinking agent is not specifically limited, and may be an isocyanate-based compound, an epoxy-based compound, an aziridine-based compound and/or a metal chelate-based compound as described above.

Here, the isocyanate-based compound may be at least one selected from the group consisting of tolylene diisocyanate, xylene diisocyanate, diphenylmethane diisocyanate, hexamethylene diisocyanate, isoboron diisocyanate, tetramethylxylene diisocyanate or naphthalene diisocyanate, and in some cases, a reaction product of at least one of the isocyanate compounds described above and a polyol (e.g., trimethylol propane) may be used. In addition, the epoxy-based compound may be at least one selected from the group consisting of ethyleneglycol diglycidylether, triglycidylether, trimethylolpropane triglycidylether, N,N,N',N'-tetraglycidyl ethylenediamine and glycerine diglycidylether, the aziridine-based compound may be at least one selected from the group consisting of N,N'-toluene-2,4-bis(1-aziridinecarboxide), N,N'-diphenylmethane-4,4'-bis(1-aziridinecarboxide), triethylene melamine, bisisoprotaloyl-1-(2-methylaziridine) and tri-1-aziridinylphosphineoxide, and the metal chelate-based compound may be a compound in which a polyvalent metal such as aluminum, iron, zinc, tin, titanium, antimony, magnesium and/or vanadium is coordinated with acetyl acetone or ethyl acetoacetate, but the present application is not limited thereto.

Moreover, the pressure-sensitive adhesive composition for the pressure-sensitive adhesive layer 400 may further include a pressure-sensitive adhesion-providing resin at 1 to 100 parts by weight with respect to 100 parts by weight of the acrylic copolymer to control pressure-sensitive adhesive performance. A kind of such a pressure-sensitive-adhesion-providing resin is not specifically limited, and may be, for example, at least one selected from a (hydrogenated) hydrocarbon-based resin, a (hydrogenated) rosin resin, a (hydrogenated) rosin ester resin, a (hydrogenated) terpene resin, a (hydrogenated) terpene phenol resin, a polymerized rosin resin, and a polymerized rosin ester resin. Here, when the content of the pressure-sensitive adhesion-providing resin is less than 1 part by weight, an addition effect may be insignificant, and when the content is more than 100 parts by weight, compatibility and/or cohesive strength-enhancing effects are probably degraded.

In addition, the pressure-sensitive adhesive composition for the pressure-sensitive adhesive layer 400 may further include a silane coupling agent at 0.005 to 5 parts by weight with respect to 100 parts by weight of the acrylic copolymer. The silane coupling agent may serve to improve thermal resistance and moisture resistance by increasing adhesive stability, and enhance adhesive reliability when maintained for a long time under a high temperature and/or high humidity. A kind of the silane coupling agent is not specifically limited, and may be, for example, at least one selected from γ-glycidoxypropyltrimethoxy silane, γ-glycidoxypropylmethyldiethoxy silane, γ-glycidoxypropyltriethoxy silane, 3-mercaptopropyltrimethoxy silane, vinyltrimethoxy silane, vinyltriethoxy silane, γ-methacryloxypropyltrimethoxy silane, γ-methacryloxypropyltrimethoxy silane, γ-methacryloxypropyltriethoxy silane, γ-aminopropyltrimethoxy silane, γ-aminopropyltriethoxy silane, 3-isocyanatopropyltriethoxy silane, and γ-acetoacetatepropyltrimethoxy silane. Here, when a content of the silane coupling agent is less than 0.005 parts by weight, the addition effect may be insignificant, and when a content of the silane coupling agent is more than 5 parts by weight, durability and reliability may be degraded due to a bubbling or peeling phenomenon.

In addition, the pressure-sensitive adhesive composition for the pressure-sensitive adhesive layer 400 may further include a curing agent. Here, when a pressure-sensitive adhesive resin (e.g., an acrylic copolymer) and a curing agent are included as the pressure-sensitive adhesive composition for the pressure-sensitive adhesive layer 400, a content of the curing agent may be 0.001 to 10 parts by weight with respect to 100 parts by weight of the pressure-sensitive adhesive resin. When the content of the curing agent is less than 0.001 parts by weight, a cohesive-strength-improving effect of the pressure-sensitive adhesive layer 400 according to the addition of the curing agent may be insignificant, and when the content of the curing agent is more than 10 parts by weight, separation may occur due to low absorbance to a stress. In consideration of this, the pressure-sensitive adhesive layer 400 includes a pressure-sensitive adhesive resin and a curing agent, and a content of the curing agent may be 0.002 to 5 parts by weight or 0.01 to 0.5 parts by weight with respect to 100 parts by weight of the pressure-sensitive adhesive resin.

According to the second example, the pressure-sensitive adhesive layer 400 satisfies the peeling strength (adhesive strength), the room temperature storage modulus, the weight average molecular weight (Mw) and/or the degree of crosslinking as described above, and may have sufficient cohesive strength that a dislocated distance is 0.5 mm or less when a vertical load of 1 kgf is applied for 4 hours to an adhesive area to the packaging film 300 of 25 mm×25 mm at room temperature or 80° C. Preferably, the dislocated distance is, for example, 0.001 to 0.5 mm (3) Third Example of Pressure-Sensitive Adhesive Layer According to the third example, the pressure-sensitive adhesive layer 400 includes a photocurable pressure-sensitive adhesive composition, and preferably has a room temperature storage modulus after photocuring of $1.0 \times 10^6$ dyn/cm$^2$ or more. That is, the pressure-sensitive adhesive layer 400 is formed by curing a photocurable pressure-sensitive adhesive composition, and has a storage modulus measured at room temperature after photocuring of $1.0 \times 10^6$ dyn/cm² or more.

When the pressure-sensitive adhesive layer 400 has a room temperature storage modulus of $1.0 \times 10^6$ dyn/cm² or more, resistance to external force may be ensured. That is, the separation phenomenon between the first region 310 and the pressure-sensitive adhesive layer 400 may be prevented by absorbing stress caused by contraction or expansion under a high temperature and/or high humidity. In addition, cohesive strength corresponding to the shearing stress is ensured, thereby preventing dislocation. Here, when the pressure-sensitive adhesive layer 400 has a room temperature storage modulus of less than $1.0 \times 10^6$ dyn/cm², the pressure-sensitive adhesive layer 400 becomes soft, and may absorb stress caused by the contraction or expansion of the second region 320, but cohesive strength corresponding to shearing stress caused by the loads of the display panel 100 and the backward diode 200 may be reduced.

Since a higher room temperature storage modulus is better, the upper limit is not specifically limited, but when the room temperature storage modulus is too high, in some cases, the absorbance to stress is decreased, and thus the separation may occur. Accordingly, the room temperature storage modulus may be, for example, $1.0 \times 10^8$ dyne/cm² or less.

In addition, in one example, the pressure-sensitive adhesive layer 400 may include a pressure-sensitive adhesive resin having a weight average molecular weight (Mw) of 1,000,000 or more for the above-described reason. A kind of the pressure-sensitive adhesive resin is as described above, and may be selected from, for example, the photocurable acrylic copolymers as described above.

According to exemplary examples, the pressure-sensitive adhesive layer 400 may be formed of a photocurable pressure-sensitive adhesive composition including an acryl copolymer, a photocurable multifunctional acrylate, and a curing agent. In addition, as needed, the pressure-sensitive adhesive layer 400 may further include a photoinitiator. Kinds of components constituting such a photocurable pressure-sensitive adhesive composition are described above. When the display panel 100 is adhered to the backward diode 200 using such a photocurable pressure-sensitive adhesive composition and UV irradiation is performed thereon, a multifunctional acrylate is cured, and thus a strong adhesive characteristic may be ensured.

According to a more particular example, the pressure-sensitive adhesive layer 400 may include 2 to 30 parts by weight of a photocurable multifunctional acrylate and 0.001 to 10 parts by weight of a curing agent with respect to 100 parts by weight of an acryl copolymer. In addition, as needed, the pressure-sensitive adhesive layer 400 may further include 0.001 to 10 parts by weight of a photoinitiator with respect to 100 parts by weight of the acrylic copolymer.

According to the third example, the pressure-sensitive adhesive layer 400 satisfies the room temperature storage modulus, the weight average molecular weight (Mw) and/or the degree of crosslinking as described above, and may have sufficient cohesive strength that a dislocated distance is 0.2 mm or less when a vertical load of 1 kgf is applied for 4 hours to an area adhered to the packaging film 300 of 25 mm×25 mm (width×length) at room temperature or 80° C.

In addition, referring to FIGS. 2 to 4, according to the thirteenth embodiment of the present application, a barrier layer 500 may be formed on a side surface of the display panel 100.

The barrier layer 500 may prevent penetration of at least external moisture into the display panel 100. To this end, the barrier layer 500 may have at least moisture impermeability (moisture blockage). In addition, the barrier layer 500 may prevent the penetration of a gas such as external air in addition to moisture, and to this end, the barrier layer 500 may have impermeability to a gas such as air, in addition to the moisture blockage.

In the present application, the barrier layer 500 is not specifically limited as long as it has at least moisture blockage. The barrier layer 500 may include at least one selected from, for example, a moisture-blocking resin layer, a metal thin film and a deposition layer.

The moisture-blocking resin layer may be a film layer formed by adhering a moisture-blocking resin film to the display panel 100, or a resin coating layer formed by coating a moisture-blocking resin composition to a side surface of the display panel 100. The resin composition constituting such a moisture-blocking resin layer is not limited, and includes heat-curable and photocurable compositions. In addition, the moisture-blocking resin layer may have, for example, a structure of one or at least two layers.

The moisture-blocking resin layer may include, for example, a styrene-based resin, a polyolefin-based resin, a thermoplastic elastomer, a polyoxyalkylene-based resin, a polyester-based resin, a polyvinyl chloride-based resin, a PC-based resin, a polyphenylenesulfide-based resin, a mixture of hydrocarbons, a polyamide-based resin, an acrylate-based resin, an epoxy-based resin, a silicon-based resin, a fluorine-based resin and/or a mixture thereof.

The styrene-based resin may be, for example, a styrene-ethylene-butadiene-styrene (SEBS) block copolymer, a styrene-isoprene-styrene (SIS) block copolymer, an acrylonitrile-butadiene-styrene (ABS) block copolymer, an acrylonitrile-styrene-acrylate (ASA) block copolymer, a styrene-butadiene-styrene (SBS) block copolymer, a styrene-based homopolymer, and/or a mixture thereof. The olefin-based resin may be, for example, a high-density PE-based resin, a low-density PE-based resin, a PP-based resin and/or a mixture thereof. The thermoplastic elastomer may include, for example, an ester-based thermoplastic elastomer, an olefin-based thermoplastic elastomer and/or a mixture thereof. Among these, as the olefin-based thermoplastic elastomer, a polybutadiene resin and/or a polyisobutene resin may be used. The polyoxyalkylene-based resin may be, for example, a polyoxymethylene-based resin, a polyoxyethylene-based resin and/or a mixture thereof. The polyester-based resin may be, for example, a polyethylene terephthalate-based resin, a polybutylene terephthalate-based resin and/or a mixture thereof. The polyvinylchloride-based resin may be, for example, polyvinylidene chloride. The mixture of the hydrocarbon may be, for example, hexatriacontane and/or paraffin. The polyamide-based resin may be, for example, nylon. The acrylate-based resin may be, for example, polybutyl(meth)acrylate. The epoxy-based resin may be, for example, a bisphenol type such as a bisphenol A-, bisphenol F-, or bisphenol S-type epoxy-based resin or a hydrogenated product thereof; a novolac type such as a phenolnovolac- or cresolnovolac-type epoxy-based resin; a nitrogen-containing cyclic type such as a cyclic triglycidylisocyanurate- or hydantoin-type epoxy-based resin; an alicyclic type; an aliphatic type; an aromatic type such as a naphthalene-type epoxy-based resin or a biphenyl-type epoxy-based resin; a glycidyl type such as a glycidylether-type epoxy-based resin, a glycidylamine-type epoxy-based resin, or a glycidylester-type epoxy-based resin; a dicyclo type such as a dicyclopentadiene-type epoxy-based resin; an ester type; an etherester type; or a mixture thereof. The silicon-based resin may be, for example, a polydimethylsiloxane. In addition, the fluorine-based resin may be a polytrifluoroethylene resin, a polytetrafluoroethylene resin, a polychlorotrifluoroethylene resin, a polyhexafluoropropylene resin, a polyvinylidene fluoride, a polyvinyl fluoride, a polyethylene propylene fluoride and/or a mixture thereof.

The resin listed as a component of the moisture-blocking resin layer may be grafted with maleic acid anhydride, copolymerized with another resin listed above or a monomer for preparing a resin, or modified by another compound, which may be a carboxyl-terminal end butadiene-acrylonitrile copolymer.

In addition, the resin listed as the moisture-blocking resin layer may include at least one heat-curable functional group or site such as a glycidyl, isocyanate, hydroxyl, carboxyl or amide group, or at least one active-energy-ray-curable functional group or site such as an epoxide, cyclic ether, sulfide, acetal or lactone group to exhibit an adhesive property after curing.

In one example, the moisture-blocking resin layer may include a polyisobutene resin. The polyisobutene resin may exhibit a low water vapor transmission rate (WVTR) and surface energy due to hydrophobicity. Particularly, the polyisobutene resin may be, for example, a homopolymer of an isobutylene monomer; and/or a copolymer prepared by copolymerizing another monomer which can be polymerized with an isobutylene monomer. Here, the monomer which can be polymerized with an isobutylene monomer may be, for example, 1-butene, 2-butene, isoprene or butadiene.

In addition, as a component of the moisture-blocking resin layer, a base resin having a weight average molecular weight (Mw) at which it can be molded in a film type may be used. According to an exemplary embodiment, the range of the weight average molecular weight (Mw) at which the base resin can be molded in a film type may be approximately 100,000 to 2,000,000, 100,000 to 1,500,000 or 100,000 to 1,000,000.

According to another exemplary embodiment, the moisture-blocking resin layer may further include a moisture remover, in addition to the above-described resin component. Accordingly, the moisture blockage of the moisture-blocking resin layer may be further enhanced. For example, the moisture remover may be uniformly dispersed in the resin layer. Here, the uniformly dispersed state may be a state in which a moisture remover is present at the same or substantially the same density in all parts of the moisture-blocking resin layer.

The moisture remover may be, for example, a metal oxide, a sulfate or an organic metal oxide. Here, although not specifically limited, the metal oxide may be magnesium oxide, calcium oxide, strontium oxide, barium oxide or aluminum oxide, the sulfate may be magnesium sulfoxide, sodium sulfoxide or nickel sulfoxide, and the organic metal oxide may be aluminum oxide octylate.

The moisture remover may use one of the above-described components, or at least two thereof. In addition, when at least two components are used as the moisture remover, for example, calcined dolomite may be used.

Such a moisture remover may have a suitable size. In one example, an average particle diameter of the moisture remover may be controlled to approximately 10 to 15,000 nm. The moisture remover having the above range of size may effectively block moisture. A content of the moisture remover may be, for example, 5 to 250 parts by weight with respect to 100 parts by weight of the resin capable of being used as moisture-blocking resin layer described above.

In addition, the moisture-blocking resin layer may further include a dispersing agent such that the moisture remover is uniformly dispersed in the resin layer. As the dispersing agent capable of being used herein, for example, a non-ionic surfactant having an affinity to a hydrophilic surface of the moisture remover and a compatibility with the resin may be used. According to another exemplary embodiment, when the moisture-blocking resin layer has moisture blockage, heat-curable and photocurable pressure-sensitive adhesive compositions as described with regard to the pressure-sensitive adhesive layer 400 may be included.

Metal foil having a thickness of 1 to 300 μm may be used as the metal thin film, and for example, a barrier layer 500 may be formed by adhering the metal thin film to the display panel 100 using an adhesive.

In addition, the deposition layer is formed by depositing at least one selected from metals and metal oxides, and may be deposited on a base film, for example, PET, PE or PP, and adhered to the display panel 100 with the base film, thereby forming a barrier layer 500.

In the present application, a metal applied as the barrier layer 500, particularly a metal constituting the metal thin film or deposition layer, may be, but is not limited to, at least one selected from the group consisting of aluminum (Al), copper (Cu), nickel (Ni), tin (Sn), zinc (Zn), indium (In), silver (Ag), tungsten (W) and iron (Fe), or an alloy of at least two thereof. In addition, the metal oxide capable of being used as the deposition layer may be selected from, for example, aluminum oxide ($Al_2O_3$), silicon oxide ($SiO_2$), tin oxide ($SiO_2$), indium oxide ($In_2O_3$) and zinc oxide (ZnO).

In addition, the barrier layer 500 includes the above-described moisture-blocking resin layer, which may be formed by coating a heat-curable and photocurable resin composition (pressure-sensitive adhesive composition), and have a peeling strength (pressure-sensitive adhesive strength) of 2.5 kgf/inch or more. The upper limit of the peeling strength is not limited. When the composition has such peeling strength, for example, binding strength to the multi-layer structure display panel 100 may be reinforced. Particularly, as the moisture-blocking resin layer is also pressure-sensitively adhered and fixed to side surfaces of a liquid crystal cell layer 120, an upper polarizing plate 140 and a lower polarizing plate 160, the binding strength between the layers of the display panel 100 may be reinforced. Particularly, a peeling strength of the moisture-blocking resin layer may be 2.5 or 20.0 kgf/inch.

In addition, according to another embodiment of the present application, the packaging film 300 may have a structure in which a protective film is formed on a first region 310, and a pressure-sensitive adhesive layer 400 is formed on the protective film. The protective film may be selected from resin films, including, for example, TAC and/or an acrylic resin. Such a protective film may have adhesive strength through the first region 310 and the pressure-sensitive adhesive.

According to the first embodiment of the present application described above, an improved display device is embodied. For example, when the backward diode 200 of the optical diode 200A is packaged by the packaging film 300, and adhered to a bottom surface of the display panel 100 through the pressure-sensitive adhesive layer 400, a bezel region becomes minimized That is, as the use of a molding frame to fix the display panel 100 with the backward diode 200 is excluded, a bezel-free display device in which almost no bezel is included may be embodied.

In addition, the backward diode 200, for example, does not consume too much time or cause damage to the optical diode 200A, which can occur in handling and assembly of the optical diode 200A on a film (or sheet). In addition, the optical diode 200A is packaged by the packaging film 300 to have sealability, and thus a light leakage phenomenon is prevented.

Second Embodiment

Hereinafter, a display device according to a second embodiment of the present application will be explained.

In FIGS. 10 to 17, examples of the display device according to the second embodiment of the present application are shown. To explain the second embodiment of the present application, the same terms and reference marks as in the first embodiment exhibit the same functions, and thus detailed description thereof will be omitted. Hereinafter, any part that is not specifically explained is the same as in the first embodiment. For example, this applies to materials and physical properties of a packaging film 300'. In addition, in some cases, the first embodiment may include a configuration of the second embodiment which will be explained below.

The display device according to the second embodiment of the present application includes a display panel 100, a backward diode 200 equipped on a bottom surface of the display panel 100, and a packaging film 300' for packaging the display panel 100 and the backward diode 200.

The packaging film 300' surrounds and packages a top surface 101 and a side surface 102 of the display panel 100. In addition, the packaging film 300' surrounds and packages at least a side surface 202 of the backward diode 200. To this end, the packaging film 300' includes a first region 310 corresponding to the top surface 101 of the display panel 100 and a second region 320 corresponding to the side surface 102 of the display panel 100 and the side surface 202 of the backward diode 200. The second region 320 extends from the first region 310.

The display panel 100 and the backward diode 200 are the same as described in the first embodiment. The display panel 100 may be any one capable of displaying an image as described in the first embodiment.

Figure 10:
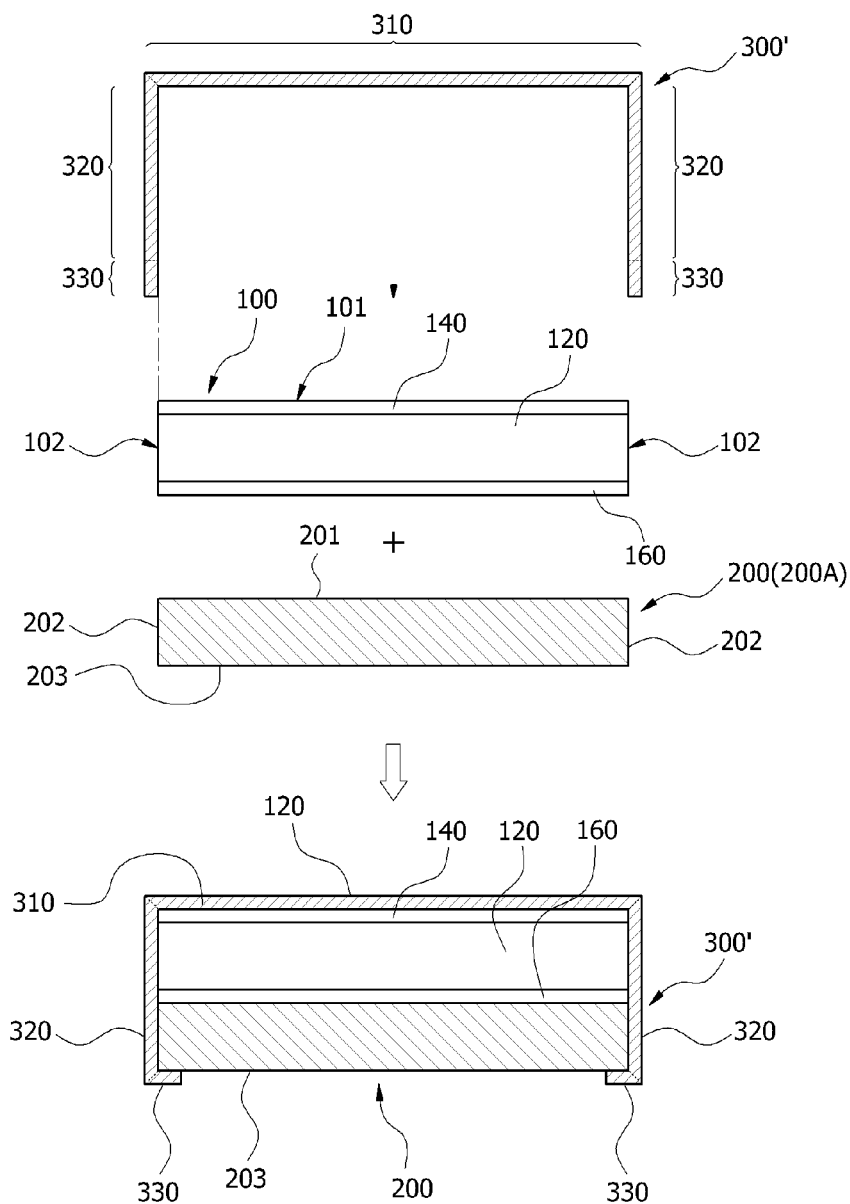
FIG. 10 is a cross-sectional view of a display device according to an embodiment of the present application.
Figure 11:
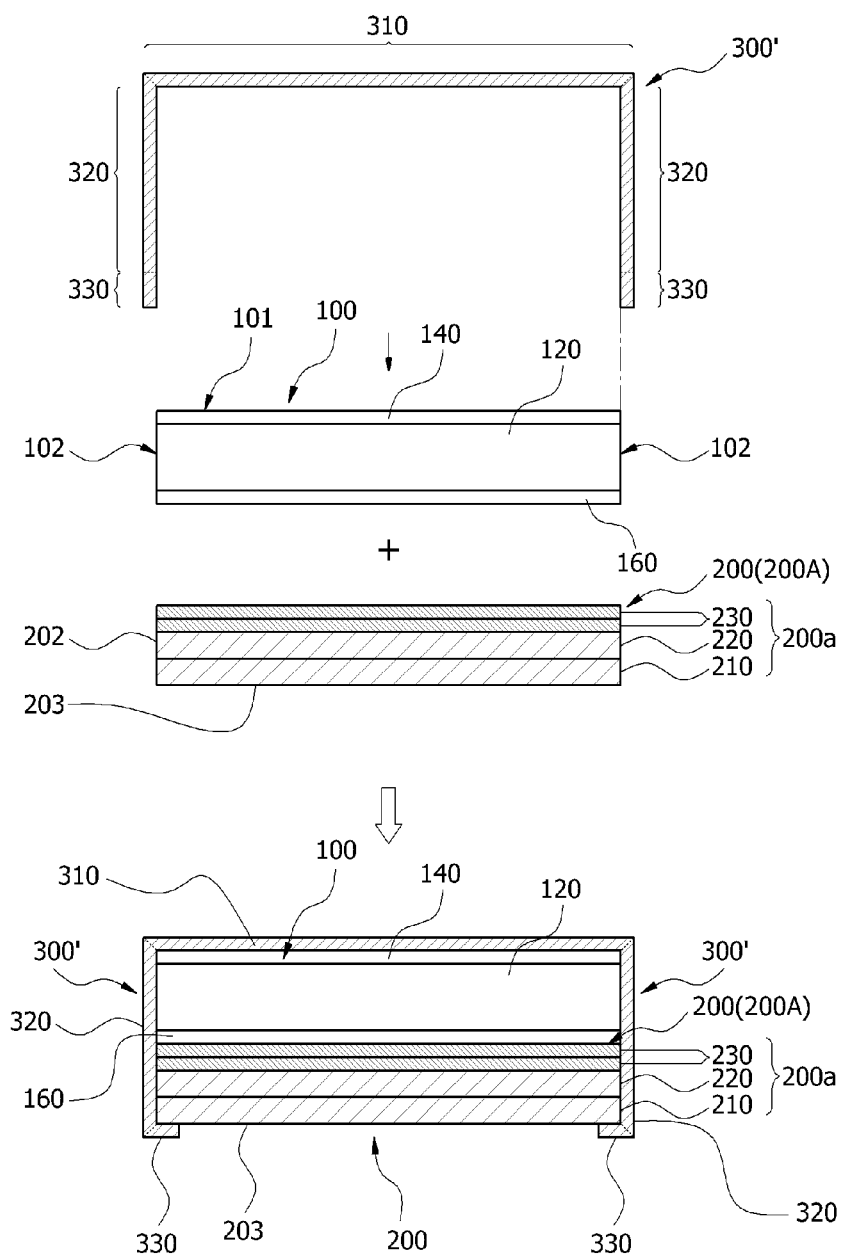
FIG. 11 is a cross-sectional view of a display device according to an embodiment of the present application.
Figure 12:
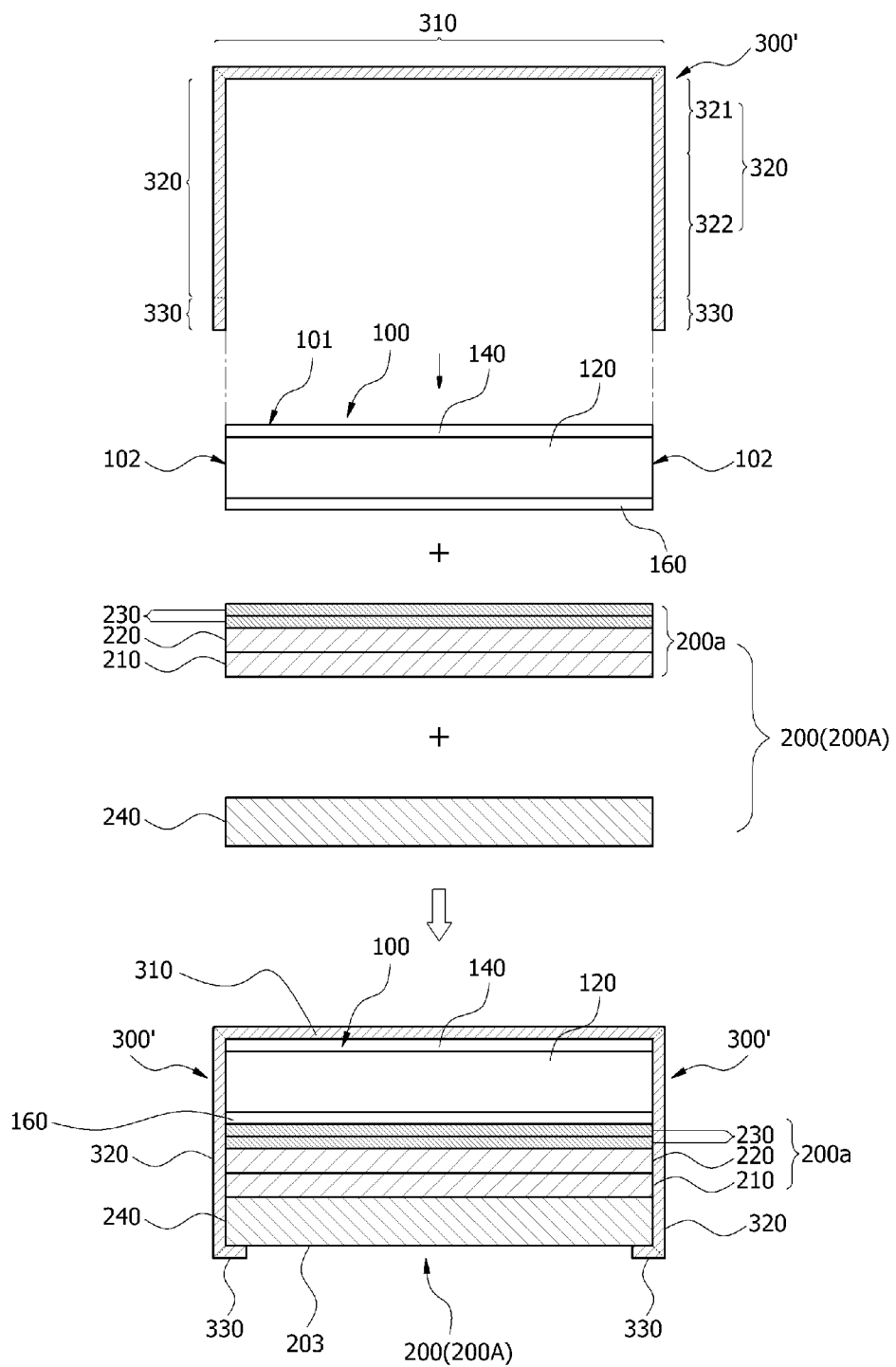
FIG. 12 is a cross-sectional view of a display device according to an embodiment of the present application.

FIGS. 10 to 12 are exemplary examples of the display panel 100. FIGS. 10 to 12 particularly show a liquid crystal display (LCD) panel.

Referring to FIGS. 10 to 12, the display panel 100 may include, for example, at least one liquid crystal cell layer 120, and a top surface polarizing plate 140 formed on the liquid crystal cell layer 120 and a bottom surface polarizing plate 160 formed under the liquid crystal cell layer 120 as polarizing plates formed on both surfaces of the liquid crystal cell layer 120.

The backward diode 200 is not particularly limited, as long as it is equipped on a bottom surface of the display panel 100 as described in the first embodiment. The backward diode 200 may be composed of one member, or a multi-layer structure including at least two members. The backward diode 200 may have, for example, a film, sheet, plane, and/or three-dimensional shape. Particularly, the backward diode 200 may include at least one selected from an electric/electronic diode having an electric/electronic function, an optical diode having an optical function, and/or a heat dissipation diode having a heat dissipating function.

FIG. 10 shows a backward diode 200 composed of one member. Here, the backward diode 200 shown in FIG. 10 may be selected from, for example, an optical diode 200A, an electronic circuit board, and a heat dissipation plate. Particularly, for example, the backward diode 200 may be selected from the optical diode 200A.

The optical diode 200A may be a diode having, for example, light diffusing, concentrating, polarizing and/or reflecting function(s), but the present application is not limited thereto. In addition, the optical diode 200A may include a light source generating light. In the present application, the optical diode 200A includes a light source generating light, and all kinds of devices, films and/or sheets used to treat light. The optical diode 200A may include at least one optical member 200a selected from, for example, a light guide plate, a diffuser sheet, a brightness enhancing film, a prism film, a lens film, a polarizing film, a reflective film, a viewing angle compensation film, a retardation film and a protective film for protecting it.

In addition, the optical diode 200A may be selected from a light source assembly further including a light source 240 in the optical member 200a as described above. In the present application, a particular embodiment of the light source assembly is not specifically limited, and may be selected from, for example, conventional direct-type and edge-type light source assemblies. Particularly, the light source assembly serving as the optical diode 200A may be selected from a BLU conventionally used in an LCD device.

FIGS. 11 and 12 show backward diodes 200, which are multi-layer optical diodes 200A. Particularly, as the backward diode 200, FIG. 11 is an optical diode 200A including a plurality of optical members 200a, and FIG. 12 is an optical diode 200A including a plurality of optical members 200a and a light source 240.

Referring to FIG. 11, the optical diode 200A may include a light guide plate 210 converting a point light source emitted from a light source into a surface light source, and a diffuser sheet 220 formed on the light guide plate 210 and diffusing light generated from the light guide plate 210 optical members 200a. In addition, the optical diode 200A may further include a brightness enhancing film 230 formed on the diffuser sheet 220. Furthermore, such optical members 200a may be formed in one or at least two layers. In FIG. 11, a brightness enhancing film 230 having a bilayer structure is shown. Such an optical diode 200A is, as shown in FIG. 11, packaged by the packaging film 300' and equipped on a bottom surface of the display panel 100. Here, in FIG. 11, a light source providing light to the light guide plate 210 is not shown, but the light source may be separately equipped outside to provide light to the light guide plate 210.

In addition, referring to FIG. 12, the optical diode 200A may be packaged by a packaging film 300' with the display panel 100 after a plurality of optical members 200a and a light source 240 are formed in an assembly. Particularly, the optical diode 200A is a light source assembly including the light source 240, which may include at least one light source 240, a light guide plate 210 formed on the light source 240 and converting a point light source emitted from the light source 240 into a surface light source, and a diffuser sheet 220 formed on the light guide plate 210 and diffusing light emitted from the light guide plate 210. In addition, as shown in FIG. 12, the optical diode 200A may further include a brightness enhancing film 230 formed on the diffuser sheet 220.

The packaging film 300' packages the display panel 100 and the backward diode 200 described above. Here, as the backward diode 200, when the optical diode 200A is packaged, the light source 240 may not be packaged by the packaging film 300' as shown in FIG. 11, or may be packaged along with the optical member 200a as shown in FIG. 12.

The packaging film 300' includes a first region 310 and a second region 320 extending from the first region 310. The first region 310 corresponds to a top surface 101 of the display panel 100. In addition, the second region 320 corresponds to a side surface 102 of the display panel 100 and a side surface 202 of the backward diode 200. Referring to FIG. 12, the second region 320 includes a first flap 321 extending from the first region 310 and a second flap 322 extending from the first flap 321. In addition, the first flap 321 corresponds to the side surface 102 of the display panel 100, and the second flap 322 corresponds to the side surface 202 of the backward diode 200.

The packaging film 300' further includes, preferably, a third region 330 providing strong fixing strength between the display panel 100 and the backward diode 200. The third region 330 extends from the second region 320, and corresponds to a bottom surface 203 of the backward diode 200.

In FIGS. 13 to 17, exemplary examples of the packaging film 300' are shown.

At least the first region 310 and the second region 320 of the regions 310, 320 and 330 of the packaging film 300' may have areas equal or similar to the parts corresponding thereto. For example, the area of the first region 310 may be equal or similar to that of the top surface 101 of the display panel 100. In addition, the area of the second region 220 may be equal or similar to the sum of the area of the side surface 102 of the display panel 100 and the area of the side surface 202 of the backward diode 200. More particularly, an area of the first flap 321 may be equal or similar to the area of the side surface 102 of the display panel 100, and an area of the second flap 322 may be equal or similar to the area of the side surface 202 of the backward diode 200.

In addition, at least two of the second regions 320 may be included. For example, two to four second regions 320 may be included. That is, the second region 320 extends from the first region 310, and may be at least two of the four surfaces of the first region 310. In addition, for example, there may be two to four third regions 330, which may be the same as the number of the second regions 320. For example, in FIG. 13, there are three second regions 320, and there are also three third regions 330.

The packaging film 300' is not limited as long as it includes the first region 310 and the second region 320 as shown above, and preferably further includes the third region 330. In addition, the regions 310, 320 and 330 may be formed in one process. The packaging film 300' may be formed in one process without a joint between the regions 310, 320 and 330 by, for example, cutting one film to have the regions 310, 320 and 330 as shown above.

A material of the packaging film 300' is the same as that used in the packaging film 300 according to the first embodiment. The packaging film 300' may be selected from transparent films. The packaging film 300' may have optical properties including polarization, concentration and/or diffusion of light when needed. At least the first region 310 may have such optical properties. In this case, it can be useful to package the optical diode 200A.

In addition, the packaging film 300' may be selected from isotropic films. In the present application, the isotropy is such that the film has little to no retardation to the extent that no substantial influence is exerted on a phase of light penetrating through the film.

The packaging film 300' may have an in-plane retardation ($R_{in}$) of, for example, 30 nm or less. The packaging film 300' may have an in-plane retardation ($R_{in}$) calculated by Equation 1 of 30 nm or less, 25 nm or less, or 10 nm or less, and preferably, for example, approximately 0 to 25 nm, 0 to 10 nm, 0.1 to 5 nm, 0.2 to 3 nm, or 0.5 to 2 nm In addition, the packaging film 300' may have a thickness-direction retardation ($R_{th}$) of 35 nm or less. The packaging film 300' may have a thickness-direction retardation ($R_{th}$) calculated by Equation 2 of, for example, 35 nm or less, 30 nm or less, 20 nm or less, or 10 nm or less, and preferably, for example, 0 to 30 nm, 0 to 20 nm, 0 to 10 nm, 0.1 to 5 nm, or 0.2 to 3 nm In the packaging of the display panel 100 and the backward diode 200, the regions 310, 320 and 330 of the packaging film 300' are bent on boundary lines C1 and C2. In the drawings, the boundary lines C1 and C2 between the regions 310, 320 and 330 are shown by dotted lines. Here, the boundary lines C1 and C2 are represented for convenience of description, and may or may not actually be visible on the packaging film 300'.

To package the display panel 100 and the backward diode 200 using the packaging film 300', for example, first, the first region 30 is located to correspond to the top surface 101 of the display panel 100, and on the first boundary line C1, the second region 320 is bent, and then the second region 320 is located to correspond to the side surface 102 of the display panel 100 and the side surface 202 of the backward diode 200. In addition, when the third region 330 is further included, on the second boundary line (C2), the third region 330 is bent, and then the third region 330 is located to correspond to the bottom surface 203 of the backward diode 200 for packaging.

According to an exemplary embodiment, the packaging film 300' may have adhesive strength between the display panel 100 and the backward diode 200. The adhesive strength may be generated, for example, at a contact interface between the display panel 100 and the backward diode 200. The adhering method may be performed by, for example, applying thermal and/or photo laminating method(s) without specific limitation. For example, the display panel 100 and the backward diode 200 may be adhered by applying heat or radiating light to the packaging film 300' for fusion. In the adhesion through such a laminating method, conditions for radiating heat and light may be suitably selected according to a kind of the packaging film 300' without specific limitation.

The packaging film 300' may have adhesive strength by being fused with the display panel 100 and the backward diode 200, for example, in at least one selected from the second region 320 and the third region 330.

According to another exemplary embodiment, the packaging film 300' may have adhesive strength to the display panel 100 and the backward diode 200 by a separate adhesive means. The adhesive means may be a pressure-sensitive adhesive layer (not shown) formed, for example, between the packaging film 300' and the display panel 100, and/or between the packaging film 100 and the backward diode 200.

The pressure-sensitive adhesive layer is preferably formed at a contact interface between the packaging film 300' and the display panel 100, and/or at a contact interface between the packaging film 300' and the backward diode 200, thereby providing binding strength therebetween. Such a pressure-sensitive adhesive layer may be coated on the packaging film 300', or coated on the display panel 100 and the backward diode 200. For example, the pressure-sensitive adhesive layer may be formed in at least one selected from the second region 320 and the third region 330. Particularly, the pressure-sensitive adhesive layer may be formed on inner surfaces of at least the second region 320 and/or the third region 330 among the regions 310, 320 and 330 of the packaging film 300', that is, on a surface in contact with the display panel 100 and the backward diode 200.

The pressure-sensitive adhesive layer is not specifically limited, as long as it has adhesive strength (pressure-sensitive adhesive strength), and may be formed by, for example, coating a pressure-sensitive adhesive composition. The pressure-sensitive adhesive composition may be selected from, for example, photocurable and/or heat-curable pressure-sensitive adhesive composition(s), which is the same as described in the first embodiment.

The packaging film 300' may be adhered at least between the second region 320 and the side surfaces 102 and 202, and/or between the third region 330 and the bottom surface 203 by fusion through heat and/or light or adhesion through the pressure-sensitive adhesive layer as described above.

In addition, the adhesive means may be, in another example, a double-sided or single-sided pressure-sensitive adhesive tape. Here, the double-sided pressure-sensitive adhesive tape may be interposed between the packaging film 300' and the panel 100/diode 200. Preferably, the double-sided pressure-sensitive adhesive tape may be interposed between the second region 320 and the side surfaces 102 and 202, and/or between the third region 330 and the bottom surface 203. In addition, the single-sided pressure-sensitive adhesive tape may be taped on an outer surface of the third region 330 to provide binding strength to the backward diode 200.

According to an exemplary embodiment, to provide strong fixing strength between the display panel 100 and the backward diode 200, the pressure-sensitive adhesive layer may be formed therebetween. The pressure-sensitive adhesive layer is the same as the pressure-sensitive adhesive layer 400 according to the first embodiment, and thus the description thereof will be omitted.

Figure 13:
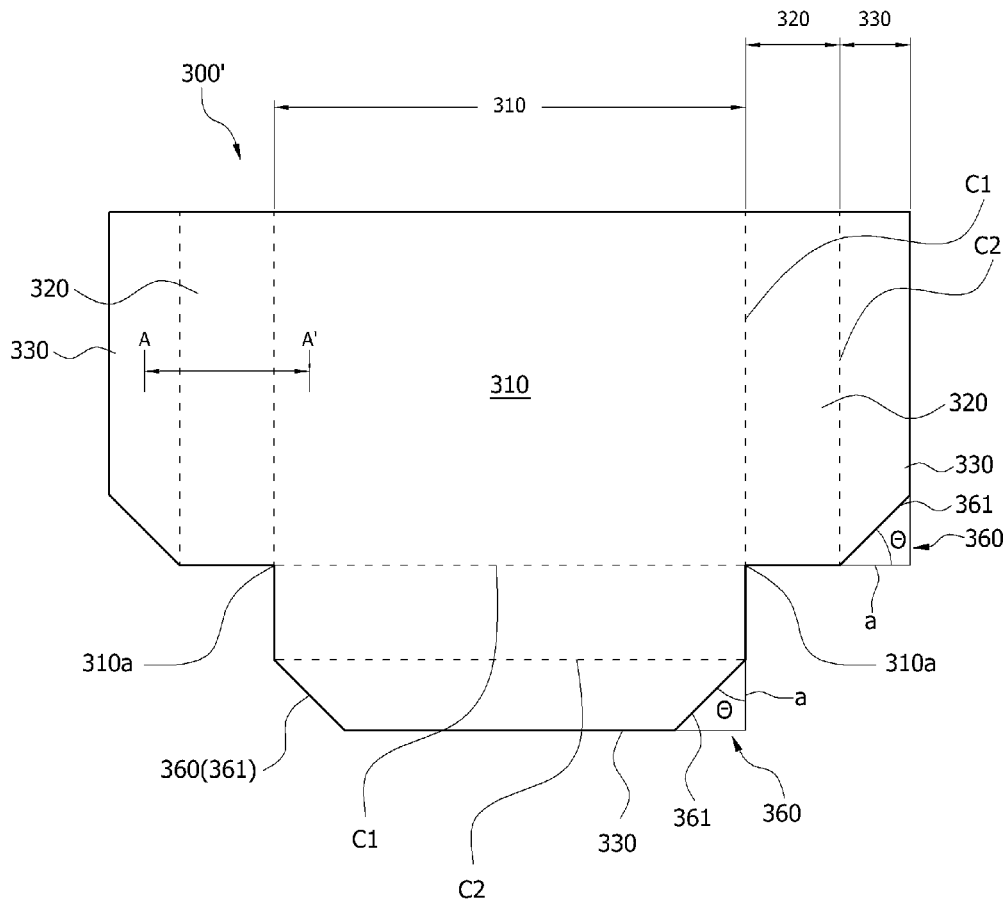
FIG. 13 is a plan view of a packaging film according to an embodiment of the present application.
Figure 14:
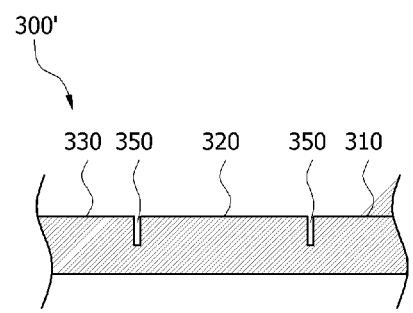
FIG. 14 is a cross-sectional view taken along line A-A' of FIG. 13.

Referring to FIGS. 13 and 14, a notch part 350 may be formed on the boundary line C1 between the first region 310 and the second region 320. In addition, when the packaging film 300' further includes the third region 330, the notch part 350 may be formed on the boundary line C2 between the second region 320 and the third region 330. FIG. 14 is a cross-sectional diagram taken along line A-A' of FIG. 13.

The notch part 350 is the same as described in the first embodiment. The notch part 350 is preferably any one that allows the second and third regions 320 and 330 to be easily bent on the boundary lines C1 and C2. The notch part 350 may be formed through notch treatment capable of producing a difference in thickness, for example, at the boundary lines C1 and C2. Specifically, the notch part 350 may be selected from a folding line imprinted part formed by pressing the boundary line C1 or C2, and a half-cut part formed by half-cutting the boundary line C1 or C2. In the present application, "half" does not mean only a half of the thickness of the packaging film 300'.

The notch part 350 may be formed to a depth of, for example, ⅓ to ⅔ of the thickness of the packaging film 300' by the folding line imprinting or half-cutting, but the present application is not limited thereto. In addition, the notch part 350 may be continuously formed along the boundary lines C1 and C2, or discontinuously formed at a predetermined interval.

In addition, the notch part 350 may have an elongation of 50 to 80% of an elongation before forming the notch part 350. Particularly, when the notch treatment (e.g., the folding line imprinting) is performed on the boundary lines C1 and C2, the elongation of the notch part 350 may be 50 to 80% of that before the notch treatment. For example, when it is assumed that the elongation of the packaging film 300' is set to 100% (two times of initial), the elongation of the notch part 350 is 50 to 80% of the elongation of the packaging film 300' before the notch treatment, which means 1.0 to 1.8 times of initial (that is, elongation of 50 to 80%). When such a notch part 350 exceeds the above range, for example, it may be difficult to bend or may break.

A thickness of the packaging film 300' is not specifically limited. The thickness of the packaging film 300' may vary depending on supporting strength, bending processability of each region 310, 320 and 330, handleability in packaging, and/or thinning of the film 300'. According to an exemplary embodiment, the thickness of the packaging film 300' may satisfy an area of the first region 310 and Equation 3. The thickness of the packaging film 300' may depend on the area of the first region 310, and is preferably, for example, in the range of approximately 20 to 500 μm, 30 to 400 μm, or 35 to 200 μm.

In addition, the packaging film 300' may have at least one mechanical property selected from, for example, (a) a tensile modulus of 1,200 MPa, (b) a tensile strength of 40 MPa or more, and (c) an elongation of 20% or more. When the packaging film 300' has such physical properties, it can package and support the display panel 100 and the backward diode 200 well.

The packaging film 300' preferably has small strain for high supporting strength, fixing strength and/or durability. The packaging film 300' preferably has a strain (E) according to Equation 4 of, for example, 5% or less.

In addition, referring to FIG. 13, the third region 330 may have an overlap preventing part 360. That is, when the third region 330 is bent to be adhered to the bottom surface 203 of the backward diode 200, the overlap preventing part 360 may be formed in the third region 330 not to overlap adjacent third regions 330.

The overlap preventing part 360 may be selected from, for example, a notched part 361 cut at a predetermined angle (θ). Here, the angle (θ) of the notched part 361 may be, for example, 15 to 85 degrees, or 30 to 60 degrees, and preferably 30 degrees or more, or 45 degrees or more. Due to such a notched part 361, the overlap with an adjacent third region 330 may be prevented. In the present application, the angle (θ) of the notched part 361 means an inclined angle made between an elongation line (a) and the side surface of the third region 360 based on the elongation line (a) elongated in a straight line direction from the second region 320 as shown in FIG. 13.

Figure 15:
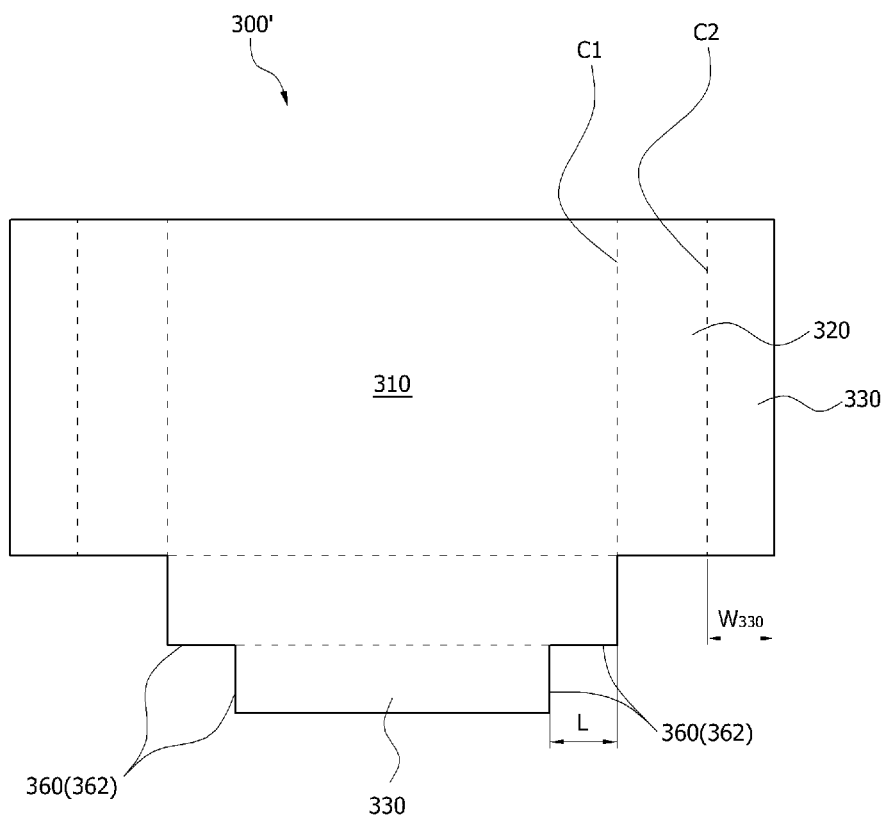
FIG. 15 is a plan view of a packaging film according to an embodiment of the present application.

FIG. 15 shows another example of the overlap preventing part 360. Referring to FIG. 15, the overlap preventing part 360 may be selected from a cut part 362 cut out in a predetermined length (L) and removed. Here, the length (L) of the cut part 362 may be, for example, larger than or the same as a width ($W_{330}$) of an adjacent third region 330. The overlap with the adjacent third region 330 may be prevented by such a cut part 362.

At least the first region 310 of the regions 310, 320 and 330 of the packaging film 300' has light transmittance (transparency). The first region 310 may have, for example, a light transmittance of 80% or more, preferably, for example, 90% or more, 95% or more, or 98% or more.

In addition, the bottom surface of the first region 310, that is, a surface (a lower surface in the drawing) in contact with the display panel 100, may have a ribbed surface in some cases. Due to such a ribbed surface, after packaging, fusion between the first region 310 and the display panel 100 may be prevented. Preferably, referring to FIG. 11, fusion between the bottom surface (the lower surface in the drawing) and the top surface (the upper surface in the drawing) of the upper polarizing plate 140 may be prevented due to the ribbed surface. The ribbed surface may be formed through various methods, which are the same as explained in the first embodiment.

According to an exemplary embodiment, an optical layer or another functional layer may be formed on at least one selected from the top surface (upper part in the drawing) and the bottom surface (lower part in the drawing) of the first region 310. Particularly, at least one functional layer selected from, for example, a polarizing layer, a light diffusion layer, a viewing angle compensation layer, a retardation layer, an anti-reflection layer, an anti-glare layer and a protective film for protecting these may be formed on the top and/or bottom surface(s) of the first region 310. Such a functional layer may be stacked on the first region 310, or may be directly formed on a surface of the first region 310 as a separate member. For example, the polarizing layer may be formed by adhering a light diffusing film to the first region 310, and the anti-reflection layer may be formed by coating an anti-reflective material on the first region 310. In another example, the anti-glare layer may be directly formed on an upper surface of the first region 310 through surface treatment such as haze treatment.

The packaging film 300' may include at least a polarizing layer formed on the first region 310 according to an exemplary embodiment. According to another exemplary embodiment, the packaging film 300' may include at least a polarizing layer formed on the first region 310, and a pressure-sensitive adhesive layer formed on the polarizing layer. Here, the pressure-sensitive adhesive layer may include the pressure-sensitive adhesive composition described in the first embodiment, thereby having the physical properties described in the first embodiment. In addition, a releasing paper may be adhered to the pressure-sensitive adhesive layer. The releasing paper may be any one that can protect the pressure-sensitive adhesive layer without specific limitation, and may be, for example, a resin film or paper having releasability.

Meanwhile, at least the second region 320 among the second and third regions 320 and 330 may have light impermeability. That is, the second region 320 is any one that can prevent light leakage to a side surface since the second region 320 has light impermeability. The second region 320 may have light transmittance of, for example, 10% or less, 5% or less, 1% or less, 0.1% or less, or 0%. According to a more particular embodiment, at least the second flap 322 of the first and second flaps 321 and 322 of the second region 320 preferably has light impermeability. In this case, it is preferable that the backward diode 200 be an optical diode 200A.

For light impermeability, the second region 320 may include, for example, at least one light leakage preventing layer selected from a light shielding layer and a reflective layer, and the light leakage preventing layer may be formed at least on the second flap 322. In addition, the third region 330 may selectively have light impermeability.

The light shielding layer may be formed, for example, by coating a light shielding material on the second region 320. In addition, the reflective layer may be formed, for example, by coating a reflective material on the second region 320. The materials constituting each of the light shielding layer and the reflective layer are not specifically limited, and are the same as described in the first embodiment.

In addition, according to an exemplary embodiment, in at least the second region 320 of the regions 310, 320 and 330, a moisture blocking bather layer for preventing penetration of external moisture may be formed. Specifically, the packaging film 300' also has the moisture blockage by itself, but to effectively block moisture, the barrier layer may be further formed in the second region 320.

It is preferable that the barrier layer be able to prevent the penetration of external moisture into the display panel 100. To this end, the barrier layer may be formed at a location corresponding to at least the first flap 321 in the second region 320, and may have impermeability to a gas such as air, in addition to the moisture impermeability (moisture blockage) to prevent penetration of a gas such as external air, in addition to blocking moisture such as humidity.

The barrier layer is not specifically limited, as long as it at least has moisture blockage. The barrier layer may be formed on at least one selected from an inner surface of the second region 320 and an outer surface of the second region 320. Such a barrier layer may include, for example, at least one selected from a moisture blocking resin layer, a metal thin film, and a deposition layer.

The moisture blocking resin layer may be, for example, a film layer formed by adhering a moisture blocking resin film to the second region 320 or the side surface 102 of the display panel 100, or a resin coating layer formed by coating a moisture blocking resin composition on the second region 320 or the side surface 102 of the display panel 100.

The resin composition constituting the moisture blocking resin layer, a metal constituting a metal thin film, and an oxide constituting a deposition layer are not specifically limited, and are the same as described in the first embodiment.

Figure 16:
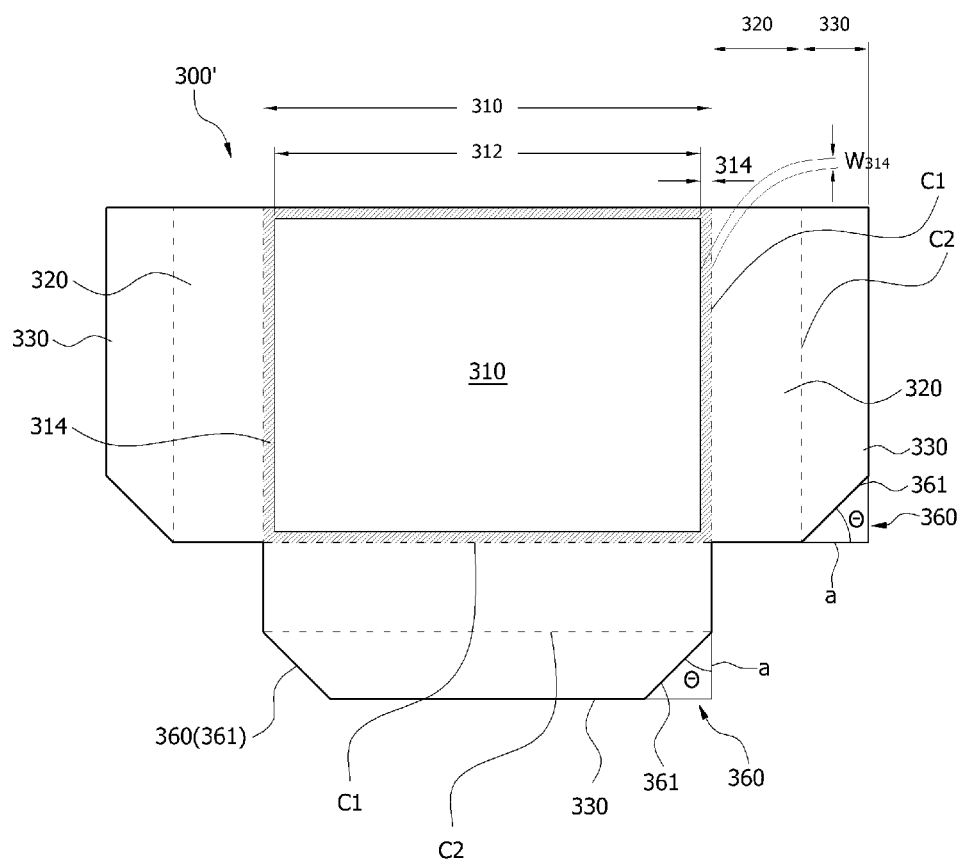
FIG. 16 is a plan view of a packaging film according to an embodiment of the present application.

Referring to FIG. 16, a light impermeable part 314 may be formed at an edge of the first region 310. As shown in FIG. 16, the first region 310 may have a light-permeable (transparent) main region 312, and a light-impermeable part 314 along a circumference of the main region 312. It is preferable that the light impermeable part 314 have light impermeability (light leakage preventability), and be the same as described in the first embodiment. The light impermeable part 314, as described in the first embodiment, may be selected from, for example, a printed layer formed by being printed with a light impermeable paint. Moreover, the light impermeable part 314 may be selected from the light shielding layer and the reflective layer as described above.

When the light impermeable part 314 is formed at the edge of the first region 310 as described above, light leakage to the side surface may be totally prevented. Since the second region 320 has light impermeability, the light leakage to the side surface is prevented, but for example, in the bending process of the packaging film 300', the packaging film 300' may not be exactly bent at the boundary lines C1 and C2, and may have allowance in some cases, thereby causing light leakage to the side surface. In addition, the first region 310 is lopsided in the packaging by the packaging film 300', and thus the edge of the first region 310 is placed on the side surface 202 of the optical diode 200A, resulting in the light leakage to the side surface. In such a case, as the light is blocked by the light impermeable part 314, the light leakage to the side surface may not be totally prevented. A width ($W_{314}$) and a thickness of the light impermeable part 314 are not specifically limited, and are the same as described in the first embodiment.

In addition, referring to FIG. 17, according to an exemplary embodiment, the first region 310 may include a projecting part 315 from which the second region 320 does not extend. Particularly, as shown in FIG. 17, the second region 320 extends from the first region 310, not from a vertex 310a of the first region 310, to have a step difference 316, and thus the first region 310 may include the projecting part 315. That is, the vertex 310a of the first region 310 may project.

When the projecting part 315 is included as described above, that is, the projecting part 315 from which the second region 320 does not extend is included in the first region 310, stress may be prevented while the second region 320 is bent. Depending on the mechanical properties or thickness of the packaging film 300', as shown in FIG. 13, when there is no projecting part 315 having a projecting vertex 310a, stress may be applied to the vertex 310a of the first region 310 when the second region 320 is bent, and thus the separation phenomenon may occur around the vertex 310a. However, when the projecting part 315 is included, such a separation phenomenon may be prevented.

According to the second embodiment of the present application described above, an improved display device is embodied. As the display panel 100 and a backward diode 200 are fixed through packaging by the packaging film 300', for example, a bezel region is minimized That is, since the use of a molding frame to fix the display panel 100 and the backward diode 200 is excluded, a bezel-free display device having almost no bezel may be embodied.

In addition, consumption of too much time and damage to the optical diode 200A, which can occur in handling and assembly of the backward diode 200, for example, the optical diode 200A on a film (or sheet), may be prevented. Moreover, the display panel 100 and the backward diode 200 are packaged by the packaging film 300', thereby preventing the permeability of external moisture or air. In addition, the optical diode 200A is packaged by the packaging film 300' to have sealability, thereby preventing the light leakage phenomenon.

Hereinafter, Examples and Comparative Examples will be illustrated. Here, the following Comparative Examples are merely provided for comparison with Examples, and are not excluded from the scope of the present application.

Examples 1 and 2 and Comparative Examples 1 and 2

A display panel and a back-side module (equipped with a BLU) embodying a 24-inch monitor were prepared and packaged with a PC film. Here, the film had various thicknesses according to Examples and Comparative Examples. Particularly, in Examples 1 and 2, films satisfying Equations 1 and 2 had thicknesses of 38 μm (Example 1) and 75 μm (Example 2), respectively. In addition, in Comparative Examples 1 and 2, films not satisfying Equation 3 had thicknesses of 25 μm (Comparative Example 1) and 250 μm (Comparative Example 2), respectively.

$$T\ [\mu m] = 100 \times S\ [m^2] + a$$ [Equation]

Here, T is a thickness (μm) of the PC film, S is a panel area (0.165 m²) of a monitor, and a is a number from 15 to 130.

After the packaged monitor was installed to be inclined approximately 10 degrees toward a wall and maintained at 60° C. for 24 hours, a degree of drooping of a display panel of the monitor was evaluated. In addition, during packaging, it was evaluated whether there were separated parts between the monitor and the film. The results of this are shown in Table 1.

TABLE 1

<Results for evaluating degree of drooping and separation phenomenon>

| Category | Example 1 | Example 2 | Comparative Example 1 | Comparative Example 2 |
|---|---|---|---|---|
| Thickness of PC film | 38 μm | 75 μm | 25 μm | 250 μm |
| Area of 24-inch monitor | 0.165 m² | 0.165 m² | 0.165 m² | 0.165 m² |
| Degree of drooping after monitor installation | None | None | Drooping (2 mm or more) | None |
| Separation phenomenon | None | None | None | Generation of separated part |

As shown in Table 1, it was seen that, in Examples 1 and 2 in which the relationship between a thickness and an area satisfied the above Equation, no drooping phenomenon or separation phenomenon occurred after the monitor was installed. However, it was seen that, in Comparative Example 1 that did not satisfy the above Equation and had a thickness that was too small compared to the area of the monitor, a drooping phenomenon occurred, and in Comparative Example 2 in which the thickness was too large, no drooping phenomenon occurred, but a separated part was generated.

Examples 3 and 4 and Comparative Example 3

Various kinds of films were prepared according to Examples 3 and 4 and Comparative Example 3, and strains (E) were first measured according to the following Equation. Here, each of the films according to Examples and Comparative Examples had a size of 60 mm×25 mm (width×length) and a thickness of 125 μm, and thus the films had the same size and thickness. The films were classified into a PC film (Example 3), a PET film (Example 4), and a PE film (Comparative Example 3).

$$E\ (\%) = [(L2-L1)/L1] \times 100$$ [Equation]

Here, L1 is the initial length of a film (60 mm), and L2 is a length extended after the film was maintained for 24 hours at 80° C. under a load of 3 kg.

Afterward, an LCD panel for embodying a 55-inch LCD TV and a back-side module (equipped with a BLU) were prepared, and packaged with each of the films according to Examples 3 and 4 and Comparative Example 3. In addition, the packaged LCD TV was installed to be inclined toward a wall at an angle of 10 degrees and maintained at 60° C. for 24 hours, and then a degree to which the LCD panel projected forward was evaluated. Here, the degrees of projection were detected by 10 persons with the naked eye, and when one or none of the 10 persons detected the projection, it was indicated as "good," and when at least two of the 10 persons detected the projection, it was indicated as "fail." The results are shown in Table 2.

TABLE 2

<Results for evaluating strain>

| Categories | Example 3 | Example 4 | Comparative Example 3 |
|---|---|---|---|
| Kind of film | PC film (125 μm) | PET film (125 μm) | PE film (125 μm) |
| Extended length [L2] (80° C., load of 3 kg) | 0.83 mm | 0.32 mm | 5 mm |
| Strain [E] | 1.4% | 0.5% | 8.3% |
| Projection degree, after installation (60° C., after 24 hours) | Good (Detected by none of 10 persons) | Good (Detected by none of 10 persons) | Fail (Detected by 3 of 10 persons) |

As shown in Table 2, in Examples 3 and 4 using the films having low strains (E), it was seen that, after the installation on the wall, the projection phenomenon did not occur.

Meanwhile, the following Examples and Comparative Examples are exemplary Experimental Examples for a pressure-sensitive adhesive layer. In the following Examples and Comparative Examples, methods of measuring physical properties are as follows.

[Measurement Methods]

1. Room Temperature Storage Modulus

A coated sample was cut to a size of 15 cm×25 cm (width×length), a PC film was removed by peeling. In addition, the sample was placed on a parallel plate of a dynamic pressure-sensitive adhesion measuring device, a gap was adjusted, normal and torque were set to zero, stabilization of normal force was identified, and then a room temperature storage modulus was measured. A particular measuring device and measuring conditions are as follows.

Measuring device: ARES-RDA, TA Instruments Inc. with forced convection oven
Measuring conditions
geometry: 8 mm parallel plate
gap: around 1 mm
test type: dynamic strain frequency sweep
strain=5.0[%]
temperature: room temperature (25° C.)
initial frequency: 0.1 rad/s, final frequency: 100 rad/s 2. Separation Phenomenon A degree of separation between the PC film and the pressure-sensitive adhesive layer was observed with a microscope after a coated sample having a size of 15 cm×25 cm (width×length) was put into a constant temperature/constant humidity container at 60° C. and a humidity of 90% for 240 hours. When there was no separation, it was indicated as "good," and when the separation occurred, it was indicated as "separated."

3. Dislocated Distance

A coated sample was cut to a size of 15 cm×25 cm (width×length) and maintained at a room temperature (approximately 15° C.) and 80° C. under a load of 1 kgf for 4 hours, and a dislocated distance between the PC film and the pressure-sensitive adhesive layer was evaluated using a microscope.

4. Peeling Strength (Pressure-Sensitive Adhesive Strength)

A coated sample was cut to a size of 15 cm×25 cm (width×length), and peeling strength (adhesive strength) was evaluated with respect to an adhesive surface between the PC film and the pressure-sensitive adhesive layer was evaluated using a texture analyzer (TA) at room temperature, a peeling angle of 180 degrees and a peeling rate of 30 mm/min Examples 5 to 8 and Comparative Examples 4 to 6

An acrylic pressure-sensitive adhesive resin was synthesized with components and in contents shown in Table 3, a curing agent was mixed, and the resulting mixture was coated on a PC film and cured, thereby forming a pressure-sensitive adhesive layer.

A room temperature storage modulus, a separation phenomenon and a dislocated distance (at room temperature and 80° C.) of the coating sample were evaluated, and the results are shown in Table 3.

TABLE 3

<Results for evaluating characteristics of pressure-sensitive adhesive layer>

| Categories | Example 5 | Example 6 | Example 7 | Example 8 | Comparative Example 4 | Comparative Example 5 | Comparative Example 6 |
|---|---|---|---|---|---|---|---|
| Pressure-sensitive adhesive resin (parts by weight) | EHA/MA/AA 65/25/10 | EHA/MA/AA 65/25/10 | EHA/MA/AA 68/25/7 | EHA/MA/AA 68/25/7 | EHA/MA/AA 65/25/10 | EHA/MA/AA 68/25/7 | BA/AA 96/4 |
| Mw | 1,700,000 | 1,450,000 | 1,800,000 | 1,430,000 | 760,000 | 760,000 | 1,750,000 |
| Curing agent (parts by weight) | 0.015 | 0.015 | 0.015 | 0.015 | 0.015 | 0.1 | 0.015 |
| G' | 8.4 | 8.3 | 7.9 | 6.8 | 4.1 | 4.8 | 5.2 |
| Crosslinking degree (%) | 56% | 49% | 58% | 46% | 4.5% | 82% | 71% |
| Separation | Good | Good | Good | Good | Good | Separated | Separated |
| Dislocated distance (room temperature) | 0 | 0 | 0 | 0 | 1.5 mm | 0 | 0.5 mm |
| Dislocated distance (80° C.) | 0.41 | 0.48 | 0.62 | 0.76 | Dislocated and detached | 0.43 | 1.7 mm |

EHA: 2-ethylhexyl acrylate
MA: methyl acrylate
AA: acrylic acid
BA: butyl acrylate
Mw: weight average molecular weight of pressure-sensitive adhesive resin
Curing agent: epoxy curing agent, based on 100 parts by weight of pressure-sensitive adhesive resin
G': room temperature storage modulus (×$10^5$ dyn/cm$^2$)

As shown in Table 3, it was seen that the physical properties changed according to a room temperature storage modulus (G'), a content of the curing agent and a crosslinking agent, and the samples according to Examples had no separation after being maintained at a high temperature/high humidity (60° C./90%) for a long time, and a dislocated distance at room temperature and 80° C. of less than 1.0 mm, thereby exhibiting excellent cohesive strength.

Examples 9 to 12 and Comparative Examples 7 to 9

An acrylic pressure-sensitive adhesive resin was synthesized with components and in contents shown in Table 4, a curing agent was mixed, and the resulting mixture was coated on a PC film and cured, thereby forming a pressure-sensitive adhesive layer.

A room temperature storage modulus, peeling strength (pressure-sensitive adhesive strength), separation and a dislocated distance (at room temperature and 80° C.) of the coating sample were evaluated, and the results are shown in Table 4.

TABLE 4

<Results for evaluating characteristics of pressure-sensitive adhesive layer>

| Categories | Example 9 | Example 10 | Example 11 | Example 12 | Comparative Example 7 | Comparative Example 8 | Comparative Example 9 |
|---|---|---|---|---|---|---|---|
| Pressure-sensitive adhesive resin (parts by weight) | EHA/MA/AA 65/25/10 | BA/MA/AA 68/25/7 | BA/MA/HBA 58/40/2 | BA/IBOA/MA/HBA 58/20/18/2 | BA/HBA 99/1 | BA/AA 90/10 | BA/AA 96/4 |
| Mw | 1,450,000 | 1,450,000 | 1,200,000 | 1,150,000 | 1,700,000 | 1,800,000 | 1,750,000 |
| Curing agent a (parts by weight) | 0.015 | 0.015 | — | — | — | 0.015 | 0.015 |
| Curing agent b (parts by weight) | — | — | 0.2 | 0.2 | 0.1 | — | — |
| G' | 8.3 | 8.3 | 9.2 | 7.6 | 4.1 | 8.2 | 5.2 |
| Peeling strength (kgf/cm) | 1.55 | 0.86 | 1.32 | 1.63 | 0.16 | 0.43 | 0.25 |
| Separation | Good | Good | Good | Good | Separated | Separated | Separated |
| Dislocated distance (room temperature) | 0 | 0 | 0 | 0 | 0.6 mm | 0 | 0.5 mm |
| Dislocated distance (80° C.) | 0.48 mm | 0.48 mm | 0.32 mm | 0.35 mm | 1.8 mm | 0.43 mm | 1.7 mm |

EHA: 2-ethylhexyl acrylate
MA: methyl acrylate
AA: acrylic acid
BA: butyl acrylate
HBA: hydroxy butyl acrylate
IBOA: isobornyl (meth)acrylate
Mw: weight average molecular weight of pressure-sensitive adhesive resin
Curing agent (a): epoxy curing agent, based on 100 parts by weight of pressure-sensitive adhesive resin
Curing agent (a): isocyanate curing agent, based on 100 parts by weight of pressure-sensitive adhesive resin
G': room temperature storage modulus ($\times 10^5$ dyn/cm$^2$)

As shown in Table 4, it was seen that the samples according to Examples had no separation after being maintained at a high temperature/high humidity (60° C./90%) for a long time, and a dislocated distance at room temperature and 80° C. of less than 0.5 mm, thereby exhibiting excellent cohesive strength.

Examples 13 to 16 and Comparative Examples 10 to 13

An acrylic pressure-sensitive adhesive resin was synthesized with components and in contents shown in Table 5, a curing agent was mixed, and the resulting mixture was coated on a PC film and cured, thereby forming a pressure-sensitive adhesive layer.

A room temperature storage modulus, peeling strength (pressure-sensitive adhesive strength), separation and a dislocated distance (at room temperature and 80° C.) of the coating sample were evaluated, and the results are shown in Table 5.

TABLE 5

<Results for evaluating characteristics of pressure-sensitive adhesive layer>

| Categories | Example 13 | Example 14 | Example 15 | Example 16 | Comparative Example 10 | Comparative Example 11 | Comparative Example 12 | Comparative Example 13 |
|---|---|---|---|---|---|---|---|---|
| Pressure-sensitive adhesive resin (parts by weight) | BA/HBA 99/1 | BA/AA 94/6 | EHA/MA/AA 65/25/10 | EHA/MA/AA 68/25/7 | BA/HBA 99/1 | BA/AA 94/6 | EHA/MA/AA 65/25/10 | EHA/MA/AA 68/25/7 |
| Mw | 1,700,000 | 1,760,000 | 1,120,000 | 1,160,000 | 1,700,000 | 1,760,000 | 1,120,000 | 1,160,000 |
| P | 12 | 12 | 12 | 12 | 0 | 0 | 0 | 0 |
| Curing agent | 0.3 | 0.3 | 0.3 | 0.3 | 0.3 | 0.3 | 0.3 | 0.3 |
| G' | $1.7 \times 10^6$ | $6.5 \times 10^6$ | $7 \times 10^6$ | $4.5 \times 10^6$ | $4.7 \times 10^5$ | $6.7 \times 10^5$ | $8.3 \times 10^5$ | $6.8 \times 10^5$ |
| Separation | Good | Good | Good | Good | Separated | Separated | Good | Good |
| Dislocated distance (room temperature) | 0 | 0 | 0 | 0 | 0.2 mm | 0 | 0 | 0 |
| Dislocated distance (80° C.) | 0.17 mm | 0.16 mm | 0.12 mm | 0.15 mm | 1.8 mm | 0.43 mm | 0.8 mm | 1.1 mm |

BA: butyl acrylate
AA: acrylic acid
EHA: 2-ethylhexyl acrylate
MA: methyl acrylate
HBA: hydroxy butyl acrylate
Mw: weight average molecular weight of pressure-sensitive adhesive resin
P: multifunctional acrylate (tris[2-acryloyloxy)ethyl] isocyanurate) was used as trifunctional acrylate), based on 100 parts by weight of pressure-sensitive adhesive resin
Curing agent: isocyanate curing agent, based on 100 parts by weight of pressure-sensitive adhesive resin
G': room temperature storage modulus (dyn/cm$^2$)

As shown in Table 5, it was seen that the samples according to Examples had no separation after being maintained at a high temperature/high humidity (60° C./90%) for a long time, and a dislocated distance at room temperature and 80° C. of less than 0.2 mm, thereby exhibiting excellent cohesive strength.

According to the present application, an improved display device can be embodied. For example, a bezel region can be minimized. In addition, in manufacture (assembly) of the display device, damage to components can be prevented, and the process can be simplified.

While the invention has been shown and described with reference to certain exemplary embodiments thereof, it will be understood by those skilled in the art that various changes in form and details may be made therein without departing from the scope of the invention as defined by the appended claims.

What is claimed is:

1. A display device, comprising:
a display panel;
a backward diode equipped on a bottom surface of the display panel;
a packaging film for packaging the backward diode; and
a pressure-sensitive adhesive layer formed between the display panel and the packaging film,
wherein the packaging film includes:
a first region corresponding to a top surface of the backward diode; and
a second region extending from the first region and corresponding to a side surface of the backward diode,
wherein the packaging film has a thickness which satisfies an area of the first region and the following Equation:

$$T\ [\mu m] = 100 \times S\ [m^2] + a \qquad \text{[Equation]}$$

where T is a thickness (μm) of the packaging film, S is an area (m$^2$) of the first region, and a is a number from 15 to 130.

2. The device according to claim 1, wherein the packaging film further includes a third region extending from the second region and corresponding to a bottom surface of the backward diode.

3. The device according to claim 1, which includes two to four second regions.

4. The device according to claim 1, wherein the packaging film has an absolute value of in-plane retardation ($R_{in}$) of 30 nm or less.

5. The device according to claim 1, wherein the packaging film has an absolute value of thickness-direction retardation ($R_{th}$) of 35 nm or less.

6. The device according to claim 2, which has a notch part formed on a boundary line between the first and second regions, or a boundary line between the second and third regions.

7. The device according to claim 2, wherein the first and second regions or the second and third regions have a bending strength of 1.0 to 10.0 gf at each boundary line.

8. The device according to claim 1, wherein the packaging film has at least one selected from the physical properties (a) to (c):
   (a) tensile modulus of 1,200 MPa or more
   (b) tensile strength of 40 MPa or more
   (c) elongation of 20% or more.

9. The device according to claim 1, wherein the packaging film has a strain (E) according to the following Equation of 5% or less:

$$E\ (\%) = [(L2-L1)/L1] \times 100 \quad \text{[Equation]}$$

where L1 is an initial length of the packaging film, and L2 is an extended length of the packaging film after being maintained for 24 hours by applying a load of 3 kg at 80° C.

10. The device according to claim 2, wherein the third region has an overlap preventing part for preventing overlap with an adjacent third region when the third region is located to correspond to the bottom surface of the backward diode through a bending process.

11. The device according to claim 1, wherein the second region is light-impermeable.

12. The device according to claim 1, wherein a light-impermeable part is formed at an edge of the first region.

13. The device according to claim 1, wherein the first region includes a projecting part from which the second region does not extend.

14. The device according to claim 1, wherein the first region has a top surface in contact with the pressure-sensitive adhesive layer, which is treated to be easily adhered.

15. The device according to claim 1, wherein the second region has a ribbed bottom surface.

16. The device according to claim 1, wherein the packaging film includes at least one selected from a polycarbonate-based resin, a polyester-based resin, a polyolefin-based resin, a cyclo-olefin polymer-based resin, an acryl-based resin, a urethane-based resin, an epoxy-based resin, a polyamide-based resin, a cellulose-based resin, a nylon-based resin and a derivative thereof.

17. The device according to claim 1, further comprising:
   a barrier layer formed on a side surface of the display panel.

18. The device according to claim 1, wherein the pressure-sensitive adhesive layer has a room temperature storage modulus of $6.0 \times 10^5$ dyn/cm$^2$ or more.

19. The device according to claim 1, wherein the pressure-sensitive adhesive layer has a peeling strength of 0.8 kgf/cm or more when peeled at room temperature and a peeling rate of 30 mm/min.

20. The device according to claim 1, wherein the pressure-sensitive adhesive layer includes a photocurable pressure-sensitive adhesive composition, and has a room temperature storage modulus after curing of $1.0 \times 10^6$ dyn/cm$^2$ or more.

21. The device according to claim 1, wherein the backward diode includes an optical diode.

22. The device according to claim 21, wherein the optical diode includes:
   a light source;
   a light guide plate converting a point light source emitted from the light source into a surface light source; and
   a diffuser sheet diffusing light emitted from the light guide plate.

* * * * *